US011422681B2

(12) United States Patent
Riscutia et al.

(10) Patent No.: US 11,422,681 B2
(45) Date of Patent: Aug. 23, 2022

(54) USER INTERFACE FOR APPLICATION COMMAND CONTROL

(71) Applicant: Microsoft Technology Licensing, LLC, Redmond, WA (US)

(72) Inventors: Vlad Riscutia, Redmond, WA (US); Julie Seto, Duvall, WA (US); Maya Rodrig, Seattle, WA (US); Matthew Vogel, Seattle, WA (US); Ramy Bebawy, Santa Clara, CA (US); Sunder Raman, San Jose, CA (US); Edward Augustus Layne, Jr., Seattle, WA (US); Jon Bell, Seattle, WA (US); Choon-Mun Hooi, Redwood City, CA (US); Kimberly Koenig, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 814 days.

(21) Appl. No.: 14/880,768

(22) Filed: Oct. 12, 2015

(65) Prior Publication Data
US 2016/0132234 A1 May 12, 2016

Related U.S. Application Data

(60) Provisional application No. 62/076,368, filed on Nov. 6, 2014.

(51) Int. Cl.
*G06F 3/0484* (2022.01)
*G06F 3/04886* (2022.01)
(Continued)

(52) U.S. Cl.
CPC ............ *G06F 3/0484* (2013.01); *G06F 3/017* (2013.01); *G06F 3/048* (2013.01); *G06F 3/0483* (2013.01);
(Continued)

(58) Field of Classification Search
CPC .................................................. G06F 3/04886
(Continued)

(56) References Cited

U.S. PATENT DOCUMENTS 5,371,844 A 12/1994 Andrew
5,420,605 A 5/1995 Vour
(Continued)

FOREIGN PATENT DOCUMENTS

CN 1735856 A 2/2006
CN 1790243 A 6/2006
(Continued)

OTHER PUBLICATIONS

ITjungles, Samsung Galaxy S4: How to Insert an Image into S Memo Note, YouTube, available at https://www.youtube.com/watch?v=pceyMh0s9nE (posted Oct. 18, 2013).*
(Continued)

*Primary Examiner* — Sherief Badawi
*Assistant Examiner* — Conrad R Pack
(74) *Attorney, Agent, or Firm* — NovoTechIP International PLLC

(57) ABSTRACT

Non-limiting examples of the present disclosure describe an application command control user interface menu to facilitate user interaction between a user and a mobile application. An application command control menu is displayed on a display screen of a processing device. An input may be received into an application canvas of a launched application. The application canvas may be positioned above the application command control menu on the display screen. In response to a received input into the application canvas, a soft input keyboard application may be displayed. The soft input keyboard application may display below the application command control menu on the display screen. A selection may be received in the application command control
(Continued)

menu. In response to the received selection, display of the application command control menu may be expanded to replace display on the soft input keyboard application on the display screen. Other examples are also described.

10 Claims, 18 Drawing Sheets

(51) Int. Cl.
*G06F 3/048* (2013.01)
*G06F 3/0483* (2013.01)
*G06F 9/451* (2018.01)
*G06F 3/01* (2006.01)
*G06F 8/38* (2018.01)
*G06T 3/40* (2006.01)

(52) U.S. Cl.
CPC ............ *G06F 3/04886* (2013.01); *G06F 8/38* (2013.01); *G06F 9/451* (2018.02); *G06T 3/4092* (2013.01); *G06F 2203/04803* (2013.01); *G06T 2200/16* (2013.01); *G06T 2200/24* (2013.01)

(58) Field of Classification Search
USPC ........................................................ 715/773
See application file for complete search history.

(56) References Cited

U.S. PATENT DOCUMENTS

| | | | |
|---|---|---|---|
| 5,499,334 A | 3/1996 | Staab | |
| 5,657,049 A * | 8/1997 | Ludolph | ............... G06F 3/0481 345/419 |
| 5,666,498 A | 9/1997 | Amro | |
| 5,760,772 A | 6/1998 | Austin | |
| 5,796,401 A | 8/1998 | Winer | |
| 5,886,694 A | 3/1999 | Breinberg et al. | |
| 5,920,315 A | 7/1999 | Santos-Gomez | |
| 6,018,346 A | 1/2000 | Moran et al. | |
| 6,300,947 B1 | 10/2001 | Kanevsky | |
| 6,335,743 B1 | 1/2002 | Owings | |
| 6,342,907 B1 | 1/2002 | Petty et al. | |
| 6,392,836 B1 | 5/2002 | Kim | |
| 6,433,801 B1 | 8/2002 | Moon | |
| 6,734,882 B1 | 5/2004 | Becker | |
| 6,791,581 B2 | 9/2004 | Novak et al. | |
| 6,950,993 B2 | 9/2005 | Breinberg | |
| 6,978,473 B1 | 12/2005 | Nsonwu et al. | |
| 7,028,306 B2 | 4/2006 | Boloker et al. | |
| 7,395,500 B2 | 7/2008 | Whittle | |
| 7,418,670 B2 | 8/2008 | Goldsmith | |
| 7,432,928 B2 | 10/2008 | Shaw et al. | |
| 7,574,669 B1 | 8/2009 | Braun | |
| 7,735,018 B2 | 6/2010 | Bakhash | |
| 7,877,703 B1 | 1/2011 | Fleming | |
| 7,949,954 B1 | 5/2011 | Jezek, Jr. | |
| 8,059,101 B2 | 11/2011 | Westerman et al. | |
| 8,078,979 B2 | 12/2011 | Howard | |
| 8,085,265 B2 | 12/2011 | Chen et al. | |
| 8,185,844 B2 | 5/2012 | Tsai | |
| 8,276,069 B2 | 9/2012 | Chen et al. | |
| 8,478,245 B2 | 7/2013 | Carion et al. | |
| 8,631,350 B2 | 1/2014 | Lepage et al. | |
| 8,713,476 B2 | 4/2014 | Martyn | |
| 8,799,325 B2 | 8/2014 | Callens et al. | |
| 8,810,605 B2 | 8/2014 | Park et al. | |
| 8,881,032 B1 | 11/2014 | Weber et al. | |
| 8,904,286 B2 | 12/2014 | Lee | |
| 8,937,636 B2 | 1/2015 | Mock | |
| 9,015,624 B2 | 4/2015 | Radtke et al. | |
| 9,021,371 B2 | 4/2015 | Mock | |
| 9,160,915 B1 | 10/2015 | Davies et al. | |
| 9,232,043 B2 | 1/2016 | Park | |
| 9,274,691 B2 | 3/2016 | Coe et al. | |
| 9,360,998 B2 | 6/2016 | Bauder et al. | |
| 9,652,109 B2 | 5/2017 | Borzello et al. | |
| 9,658,741 B2 | 5/2017 | Pauly et al. | |
| 9,721,034 B2 | 8/2017 | Moore et al. | |
| 2002/0101450 A1 | 8/2002 | Magendanz et al. | |
| 2002/0103817 A1 | 8/2002 | Novak et al. | |
| 2002/0109718 A1 | 8/2002 | Mansour et al. | |
| 2002/0126142 A1 | 9/2002 | Hodgkinson | |
| 2003/0063120 A1 | 4/2003 | Wong | |
| 2003/0067489 A1 | 4/2003 | Candy Wong | |
| 2003/0070061 A1 | 4/2003 | Wong | |
| 2003/0146927 A1 | 8/2003 | Crow | |
| 2004/0056894 A1 | 3/2004 | Zaika et al. | |
| 2004/0075693 A1 | 4/2004 | Moyer et al. | |
| 2004/0119745 A1 | 6/2004 | Bartek et al. | |
| 2004/0153973 A1 | 8/2004 | Horwitz | |
| 2004/0162060 A1 | 8/2004 | Hara et al. | |
| 2004/0163046 A1 | 8/2004 | Chu et al. | |
| 2004/0223004 A1 * | 11/2004 | Lincke | .................. G06F 1/1626 345/649 |
| 2004/0268259 A1 | 12/2004 | Rockey et al. | |
| 2005/0054384 A1 | 3/2005 | Pasquale et al. | |
| 2005/0055645 A1 | 3/2005 | Matthews et al. | |
| 2005/0066037 A1 | 3/2005 | Song et al. | |
| 2005/0076309 A1 | 4/2005 | Goldsmith | |
| 2005/0246647 A1 | 11/2005 | Beam et al. | |
| 2006/0020899 A1 | 1/2006 | Gusmorino et al. | |
| 2006/0082518 A1 | 4/2006 | Ram | |
| 2006/0101354 A1 | 5/2006 | Hashimoto et al. | |
| 2006/0236264 A1 | 10/2006 | Cain et al. | |
| 2006/0284893 A1 | 12/2006 | Hlad | |
| 2007/0124669 A1 | 5/2007 | Makela | |
| 2007/0266335 A1 | 11/2007 | Zielinski et al. | |
| 2008/0002115 A1 | 1/2008 | Polak | |
| 2008/0005701 A1 | 1/2008 | Park et al. | |
| 2008/0163112 A1 | 7/2008 | Lee et al. | |
| 2008/0178073 A1 | 7/2008 | Gao | |
| 2008/0244440 A1 | 10/2008 | Bailey et al. | |
| 2008/0273297 A1 | 11/2008 | Kumar | |
| 2009/0058885 A1 | 3/2009 | Park et al. | |
| 2009/0140977 A1 | 6/2009 | Morris | |
| 2009/0192849 A1 * | 7/2009 | Hughes | ..................... G06F 8/10 705/7.11 |
| 2009/0222767 A1 | 9/2009 | Matthews et al. | |
| 2009/0260022 A1 | 10/2009 | Louch et al. | |
| 2009/0278806 A1 | 11/2009 | Duarte et al. | |
| 2009/0282360 A1 | 11/2009 | Park et al. | |
| 2009/0288013 A1 | 11/2009 | Zhang et al. | |
| 2009/0303676 A1 | 12/2009 | Behar et al. | |
| 2009/0319953 A1 | 12/2009 | Tsai | |
| 2010/0060587 A1 | 3/2010 | Freund | |
| 2010/0122215 A1 | 5/2010 | MacGregor | |
| 2010/0138767 A1 | 6/2010 | Wang et al. | |
| 2010/0138778 A1 | 6/2010 | Dewan et al. | |
| 2010/0138780 A1 | 6/2010 | Marano et al. | |
| 2010/0251152 A1 | 9/2010 | Cho et al. | |
| 2010/0269062 A1 | 10/2010 | Kobylinski | |
| 2010/0274869 A1 | 10/2010 | Warila et al. | |
| 2010/0302278 A1 * | 12/2010 | Shaffer | ................. G06F 3/0481 345/659 |
| 2011/0007009 A1 * | 1/2011 | Ishihara | ................ G06F 1/1624 345/173 |
| 2011/0016431 A1 | 1/2011 | Grosz et al. | |
| 2011/0025706 A1 | 2/2011 | Etelapera | |
| 2011/0041092 A1 | 2/2011 | Zhan | |
| 2011/0107227 A1 | 5/2011 | Rempell et al. | |
| 2011/0119628 A1 | 5/2011 | Carter | |
| 2011/0126154 A1 | 5/2011 | Boehler | |
| 2011/0179373 A1 | 7/2011 | Moore et al. | |
| 2011/0202882 A1 | 8/2011 | Forstall et al. | |
| 2011/0214077 A1 | 9/2011 | Singh et al. | |
| 2011/0219332 A1 | 9/2011 | Park | |
| 2011/0242750 A1 | 10/2011 | Oakley | |
| 2011/0307804 A1 | 12/2011 | Spierer | |
| 2012/0017172 A1 | 1/2012 | Sheth et al. | |
| 2012/0023453 A1 * | 1/2012 | Wagner | ............... G06F 3/04886 715/848 |
| 2012/0030584 A1 | 2/2012 | Bian | |

(56) References Cited

U.S. PATENT DOCUMENTS

| | | |
|---|---|---|
| 2012/0054671 A1* | 3/2012 | Thompson .............. G06F 3/038 715/784 |
| 2012/0062688 A1 | 3/2012 | Shen et al. |
| 2012/0117506 A1* | 5/2012 | Koch .................. G06F 3/04886 715/773 |
| 2012/0127206 A1* | 5/2012 | Thompson .......... G06F 3/04883 345/661 |
| 2012/0216139 A1 | 8/2012 | Ording et al. |
| 2012/0240056 A1 | 9/2012 | Webber |
| 2012/0265978 A1 | 10/2012 | Shenfield et al. |
| 2012/0266069 A1* | 10/2012 | Moshiri ............. H04N 21/4782 715/719 |
| 2012/0287114 A1 | 11/2012 | Hallock et al. |
| 2013/0002592 A1* | 1/2013 | Chaudhri .............. G06F 3/0485 345/173 |
| 2013/0019150 A1 | 1/2013 | Zarom |
| 2013/0019182 A1 | 1/2013 | Gil |
| 2013/0019183 A1 | 1/2013 | Reeves et al. |
| 2013/0019206 A1 | 1/2013 | Kotler et al. |
| 2013/0024778 A1 | 1/2013 | Reeves et al. |
| 2013/0024851 A1 | 1/2013 | Firman et al. |
| 2013/0036443 A1 | 2/2013 | Kandanala et al. |
| 2013/0050141 A1* | 2/2013 | Park ...................... G06F 3/0488 345/174 |
| 2013/0084920 A1 | 4/2013 | Sawhney |
| 2013/0113720 A1* | 5/2013 | Van Eerd ............ G06F 3/04817 345/173 |
| 2013/0117713 A1 | 5/2013 | Bauder |
| 2013/0120302 A1 | 5/2013 | Kang et al. |
| 2013/0125049 A1 | 5/2013 | Dhawan |
| 2013/0159417 A1 | 6/2013 | Meckler et al. |
| 2013/0159902 A1 | 6/2013 | Kwak et al. |
| 2013/0159917 A1 | 6/2013 | Loebach |
| 2013/0174047 A1 | 7/2013 | Sivakumar |
| 2013/0174066 A1 | 7/2013 | Felix |
| 2013/0174079 A1 | 7/2013 | Morley et al. |
| 2013/0179840 A1 | 7/2013 | Fisher et al. |
| 2013/0191781 A1 | 7/2013 | Radakovitz et al. |
| 2013/0212487 A1 | 8/2013 | Cote |
| 2013/0212535 A1 | 8/2013 | Kim |
| 2013/0222434 A1 | 8/2013 | Park et al. |
| 2013/0227413 A1 | 8/2013 | Thorsander et al. |
| 2013/0227454 A1 | 8/2013 | Thorsander et al. |
| 2013/0227470 A1 | 8/2013 | Thorsander et al. |
| 2013/0227482 A1 | 8/2013 | Thorsander et al. |
| 2013/0227483 A1 | 8/2013 | Thorsander et al. |
| 2013/0227490 A1 | 8/2013 | Thorsander et al. |
| 2013/0268875 A1 | 10/2013 | Han et al. |
| 2013/0278708 A1 | 10/2013 | Mock |
| 2013/0283185 A1 | 10/2013 | Mock |
| 2013/0285926 A1* | 10/2013 | Griffin ................ G06F 3/04886 345/173 |
| 2014/0013271 A1 | 1/2014 | Moore et al. |
| 2014/0026099 A1 | 1/2014 | Andersson et al. |
| 2014/0033110 A1 | 1/2014 | Darden |
| 2014/0040781 A1 | 2/2014 | Epstein |
| 2014/0055495 A1 | 2/2014 | Kim et al. |
| 2014/0075367 A1 | 3/2014 | Abuelsaad et al. |
| 2014/0108936 A1* | 4/2014 | Khosropour ............ G06F 9/451 715/735 |
| 2014/0143683 A1 | 5/2014 | Underwood et al. |
| 2014/0143708 A1 | 5/2014 | Yang et al. |
| 2014/0157163 A1 | 6/2014 | Strutin-Belinoff et al. |
| 2014/0157390 A1* | 6/2014 | Lurey ...................... G06F 21/41 726/7 |
| 2014/0189595 A1 | 7/2014 | Waldman et al. |
| 2014/0201672 A1 | 7/2014 | Borzello |
| 2014/0208197 A1 | 7/2014 | Ellis et al. |
| 2014/0223347 A1 | 8/2014 | Seo et al. |
| 2014/0282055 A1 | 9/2014 | Engel et al. |
| 2014/0282178 A1 | 9/2014 | Borzello |
| 2014/0282243 A1 | 9/2014 | Eye et al. |
| 2014/0282254 A1 | 9/2014 | Feiereisen et al. |
| 2014/0304615 A1 | 10/2014 | Coe |
| 2014/0310643 A1 | 10/2014 | Karmanenko et al. |
| 2014/0325054 A1 | 10/2014 | Agrawal et al. |
| 2014/0325345 A1 | 10/2014 | Vano et al. |
| 2014/0325367 A1 | 10/2014 | Fear |
| 2014/0337744 A1 | 11/2014 | She et al. |
| 2014/0340591 A1 | 11/2014 | Chang et al. |
| 2015/0033188 A1 | 1/2015 | Devi |
| 2015/0061968 A1 | 3/2015 | Park et al. |
| 2015/0074518 A1 | 3/2015 | Rumsey |
| 2015/0082242 A1 | 3/2015 | Antipa |
| 2015/0088669 A1 | 3/2015 | Kwak |
| 2015/0095767 A1 | 4/2015 | Tammam et al. |
| 2015/0143271 A1 | 5/2015 | Sanders et al. |
| 2015/0169197 A1 | 6/2015 | Muto |
| 2015/0169219 A1 | 6/2015 | Koenig et al. |
| 2015/0277682 A1 | 10/2015 | Kaufthal et al. |
| 2015/0277726 A1 | 10/2015 | Maloney |
| 2015/0286359 A1 | 10/2015 | Oakley et al. |
| 2016/0132195 A1 | 5/2016 | Seto et al. |
| 2016/0132203 A1 | 5/2016 | Seto et al. |
| 2016/0132301 A1 | 5/2016 | Riscutia et al. |
| 2016/0132992 A1 | 5/2016 | Rodrig et al. |
| 2016/0209973 A1 | 7/2016 | Kaufthal et al. |
| 2016/0209994 A1 | 7/2016 | Kaufthal et al. |
| 2016/0292133 A1 | 10/2016 | Elings et al. |
| 2016/0320938 A9 | 11/2016 | Massand |
| 2016/0351047 A1* | 12/2016 | Han ...................... G06F 13/14 |
| 2016/0364219 A9 | 12/2016 | Grey et al. |
| 2017/0329495 A1 | 11/2017 | Feiereisen |
| 2018/0004544 A1 | 1/2018 | Vasiltschenko et al. |

FOREIGN PATENT DOCUMENTS

| | | |
|---|---|---|
| CN | 101278252 A | 10/2008 |
| EP | 1873623 | 1/2008 |
| EP | 2312427 | 4/2011 |
| KR | 20080000712 A | 1/2008 |
| WO | WO 2011/153623 | 12/2011 |
| WO | 2013/0135815 | 9/2013 |
| WO | 2014117241 | 8/2014 |
| WO | WO 2014152149 | 9/2014 |

OTHER PUBLICATIONS

Sage, Simon, How to Use S Memo on the Samsung Galaxy S4, Android Central, available at https://www.androidcentral.com/how-use-s-memo-samsung-galaxy-s4, pp. 1-11 (Feb. 5, 2014).*
PCT International Preliminary Reporton Patentability in PCT/US2015/059323, dated Jan. 20, 2017, 8 pages.
U.S. Appl. No. 13/834,496, Amendment and Response filed Dec. 1, 2016, 9 pages.
U.S. Appl. No. 13/834,496, Office Action dated Jan. 12, 2017, 20 pages.
U.S. Appl. No. 14/640,573, Office Action dated Aug. 9, 2017, 22 pgs.
U.S. Appl. No. 14/726,868, Office Action dated Aug. 7, 2017, 22 pgs.
U.S. Appl. No. 14/727,226, Amendment and Response filed Sep. 22, 2017, 20 pages.
U.S. Appl. No. 13/834,496, Amendment after Allowance filed Jul. 21, 2017, 7 pgs.
U.S. Appl. No. 13/834,496, USPTO Response dated Sep. 20, 2017, 2 pgs.
"Css3menu", Retrieved on: Jun. 17, 2015, Available at: http://css3menu.com/, 16 pgs.
"Guidelines for Supporting Multiple Screen Sizes", Retrieved on: Mar. 13, 2015, Available at: https://msdn.microsoft.com/en-in/library/windows/apps/hh465349.aspx, 6 pgs.
"Microsoft Office Apps for Android Mobile Phones", Published on: Jun. 15, 2015, Available at: http://www.askvg.com/review-microsoft-office-apps-for-android-mobile-phones/, 5 pgs.
"Mobile", Retrieved on: Nov. 11, 2014, Available at http://help.board.com/Mobile.htm, 9 pgs.
"Multi Swipe Controls Template", Retrieved at «http://www.deepblueapps.com/multi-swipe-controls-template/», Retrieved Date: Mar. 5, 2013, pp. 3.

(56) References Cited

OTHER PUBLICATIONS

"Nexus 4 Guidebook", Retrieved at «http://static.googleusercontent.com/external_content/untrusted_dlcp/www.google.com/en//help/hc/images/android/android_ug_42/Nexus-4-Guidebook.pdf», Retrieved Date: Mar. 5, 2013, pp. 235.
"Prioritizing Your Data", Retrieved at «http://technet.microsoft.com/en-us/library/cc749544(v=ws.10).aspx», Jun. 11, 2010, pp. 3.
"Quickstart: Control templates (XAML)", Retrieved on: Mar. 20, 2015, Available at: https://msdn.microsoft.com/en-us/library/windows/apps/xaml/hh465374.aspx, 6 pgs.
"Split-screen User Interface", Retrieved on: Nov. 11, 2014, Available at http://www.uscellular.com/uscellular/pdf/samsung-note-2-split-screen.pdf, 1 page.
"Supporting Multiple Screens", Published on: Jul. 8, 2012, Available at: http://developer.android.com/guide/practices/screens_support.html, 26 pgs.
"Supporting Multiple Screens", Published on: Jul. 28, 2011, Available at: http://developer.android.com/guide/practices/screens_support.html, 16 pgs.
"Swipe for Action", Retrieved at «http://www.androidpatterns.com/uap_pattern/swipe-for-action», Retrieved date Mar. 12, 2013, pp. 6.
"Touch Interaction Design (Windows Store apps) (Windows)", Retrieved at «http://msdn.microsoft.com/en-in/library/windows/apps/hh465415.aspx», Retrieved Date: Mar. 5, 2013, pp. 13.
"View Office Documents on your Cell Phone", Retrieved on: Jun. 17, 2015, Available at: https://support.office.com/en-in/article/View-Office-documents-on-your-cell-phone-9c134bbf-7fa5-40ca-b379-2be5ff331504, 6 pgs.
"WPS Mobile Office for Android 7.0", Retrieved on: Jun. 17, 2015, 5 p. , Available at: http://assistly-production.s3.amazonaws.com/179952/kb_article_attachments/48665/Andraid_QSG2_original.pdf?AWSAccessKeyId=AKIAJNSFWOZ6ZS23BMKQ&Expires=1435118587&Signature=p2GBars78GoAcuGZ5Pdr8IMEx1c%3D&response-content-disposition=filename%3D%22Android_QSG2.pdf%22&response-content-type=application%2Fpdf.
BCGControlBar Library for .NET—Summary, Published on: Feb. 7, 2007, Available at http://www.componentsource.com/products/bcgcontrolbar-net/summary.html, 12 pgs.
Birch, Nataly, "Vertical Navigation Implementation of Side Menu in Mobile Apps", Published on: Jul. 15, 2013, Available at: http://designmodo.com/vertical-side-menu-mobile-apps/, 17 pgs.
Chaize, Michael, "Adaptive UI: Mobile Vs Tablet", Published on: Jun. 24, 2011, Available at: http://www.riagora.com/2011/06/adaptive-ui-mobile-vs-tablet/, 7 pgs.
Gajos, Krzysztof Z., "Automatically Generating Personalized User Interfaces", In PhD Thesis, Jun. 20, 2010, 210 pages.
Gajosa, et al., "Automatically Generating Personalized User Interfaces with Supple", In Journal of Artificial Intelligence, vol. 174, Issue 12-13, Aug. 2010, 49 pages.
Kingsley, Allie, "15+ Best Free Navigation Menus", Published on: Mar. 17, 2015, Available at: http://designscrazed.org/best-free-navigation-menus/, 9 pgs.
Knowlton, Gray, "Using the New Office with Touch", Published on: Jul. 18, 2012, Available at: https://blogs.office.com/2012/07/18/using-the-new-office-with-touch/, 21 pgs.
Prospero, Michael A., "How to Use Control Center in iOS 7", Published on: Sep. 18, 2013, Available at http://blog.laptopmag.com/use-control-center-ios-7, 3 pgs.
Protalinski, Emil, "Microsoft Launches Word, Excel, and PowerPoint previews for Android Phones", Published on: May 19, 2015, Available at: http://venturebeat.com/2015/05/19/microsoft-launches-word-excel-and-powerpoint-for-android-phones/, 2 pgs.
Richardson, Jeff, "Review: Microsoft Office Mobile for iPhone", Published on: Jun. 18, 2013, Available at: http://www.iphonejd.com/iphone_jd/2013/06/review-microsoft-office-mobile-for-iphone.html, 6 pgs.
Richardson, Jeff, "Review: Microsoft Word for Iphone and Ipad—View and Edit Word Documents on any IOS Device", Published on: Nov. 7, 2014, Available at: http://www.iphonejd.com/iphone_jd/2014/11/review-microsoft-word.html, 11 pgs.
Roth, et al., "Bezel Swipe: Conflict-Free Scrolling and Multiple Selection on Mobile Touch Screen Devices", Retrieved at «http://www.volkerroth.com/download/Roth2009a.pdf», In Proceedings of the SIGCHI Conference on Human Factors in Computing Systems, Apr. 4, 2009, 4 pgs.
Thornton, Tessa, Big Menus, Small Screens: Responsive, Multi-Level Navigation, Published on: Sep. 13, 2012, Available at: http://webdesign.tutsplus.com/tutorials/big-menus-small-screens-responsive-multi-level-navigation--webdesign-8452, 27 pgs.
U.S. Appl. No. 10/252,068, Advisory Action dated Mar. 8, 2007, 3 pgs.
U.S. Appl. No. 10/252,068, Advisory Action dated Jul. 31, 2009, 3 pgs.
U.S. Appl. No. 10/252,068, Amendment and Response filed Jan. 31, 2009, 26 pgs.
U.S. Appl. No. 10/252,068, Amendment and Response filed Jan. 6, 2010, 16 pgs.
U.S. Appl. No. 10/252,068, Amendment and Response filed Feb. 14, 2007, 10 pgs.
U.S. Appl. No. 10/252,068, Amendment and Response filed Mar. 14, 2007, 15 pgs.
U.S. Appl. No. 10/252,068, Amendment and Response filed Jul. 11, 2009, 26 pgs.
U.S. Appl. No. 10/252,068, Amendment and Response filed Jul. 26, 2010, 36 pgs.
U.S. Appl. No. 10/252,068, Amendment and Response filed Jul. 9, 2008, 20 pgs.
U.S. Appl. No. 10/252,068, Amendment and Response filed Aug. 12, 2009, 14 pgs.
U.S. Appl. No. 10/252,068, Amendment and Response filed Sep. 14, 2007, 15 pgs.
U.S. Appl. No. 10/252,068, Amendment and Response filed Sep. 27, 2006, 22 pgs.
U.S. Appl. No. 10/252,068, Office Action dated Oct. 12, 2010, 18 pgs.
U.S. Appl. No. 10/252,068, Office Action dated Oct. 30, 2008, 15 pgs.
U.S. Appl. No. 10/252,068, Office Action dated Oct. 5, 2009, 17 pgs.
U.S. Appl. No. 10/252,068, Office Action dated Nov. 28, 2007, 13 pgs.
U.S. Appl. No. 10/252,068, Office Action dated Dec. 14, 2006, 9 pgs.
U.S. Appl. No. 10/252,068, Office Action dated Apr. 26, 2010, 17 pgs.
U.S. Appl. No. 10/252,068, Office Action dated May 11, 2009, 16 pgs.
U.S. Appl. No. 10/252,068, Office Action dated Jun. 14, 2007, 13 pgs.
U.S. Appl. No. 10/252,068, Office Action dated Jun. 27, 2006, 10 pgs.
U.S. Appl. No. 13/834,496, Advisory Action dated Aug. 20, 2015, 3 pgs.
U.S. Appl. No. 13/834,496, Amendment after Final OA filed Aug. 3, 2015, 8 pgs.
U.S. Appl. No. 13/834,496, Amendment and Response filed Apr. 16, 2015, 8 pgs.
U.S. Appl. No. 13/834,496, Office Action dated Jan. 16, 2015, 17 pgs.
U.S. Appl. No. 13/834,496, Office Action dated Oct. 1, 2015, 17 pgs.
U.S. Appl. No. 13/834,496, Office Action dated Jun. 3, 2015, 15 pgs.
Wilson, Mark, "3 Ways Bigger iPhones Will Change App Design", published on: Sep. 18, 2014, Available at http://www.fastcodesign.com/3035890/innovation-by-design/3-ways-bigger-iphones-will-change-app-design, 9 pgs.
Zheng, Long, "Dissecting the Windows 8 Touch UI Demo from D9", Retrieved at «http://www.istartedsomething.com/20110602/dissecting-the-windows-8-touch-ui-demo-from-d9/», Jun. 2, 2011, pp. 26.
PCT International Second Written Opinion in international Application PCT/US2015/059323, dated Sep. 13, 2016, 7 pgs.

(56) References Cited

OTHER PUBLICATIONS

U.S. Appl. No. 13/834,496, Office Action dated Sep. 9, 2016, 18 pages.
"Non Final Office Action Issued in U.S. Appl. No. 14/726,868", dated Jan. 4, 2019, 30 Pages.
Khalilbeigi, et al., "FoldMe: Interacting with Double-sided Foldable Displays", In Proceedings of the Sixth International Conference on Tangible, Embedded and Embodied Interaction, Feb. 19, 2012, 8 Pages.
U.S. Appl. No. 14/640,573, Office Action dated Feb. 22, 2018, 21 pgs.
U.S. Appl. No. 14/726,868, Amendment and Response filed Feb. 7, 2018, 22 pgs.
"Final Office Action Issued in U.S. Appl. No. 14/726,868", dated Jun. 7, 2018, 28 Pages.
"Final Office Action Issued in U.S. Appl. No. 14/640,573", dated Sep. 20, 2018, 19 Pages.
U.S. Appl. No. 14/840,360, Office Action dated Nov. 29, 2018, 17 pages.
U.S. Appl. No. 14/727,226, Office Action dated Nov. 29, 2018, 10 pages.
U.S. Appl. No. 14/640,573, Amendment and Response filed Nov. 8, 2017, 10 pgs.
U.S. Appl. No. 14/727,226, Office Action dated Dec. 13, 2017, 11 pages.
PCT International Search Report and Written Opinion in International Application PCT/US2015/059323, dated Feb. 10, 2016, 12 pgs.
U.S. Appl. No. 13/834,496, Amendment dated Feb. 29, 2016, 5 pgs.
U.S. Appl. No. 13/834,496, Office Action dated Apr. 22, 2016, 17 pgs.
U.S. Appl. No. 13/834,496, Amendment and Response filed Jun. 29, 2016, 10 pgs.
U.S. Appl. No. 14/840,360, Office Action dated Apr. 9, 2018, 21 pages.
Demekis, Jim, "The Eyedropper Tool in Powerpoint", Aug. 27, 2013, pp. 1-4.
U.S. Appl. No. 14/640,573, Amendment and Response filed May 9, 2018, 21 pgs.
U.S. Appl. No. 14/727,226, Amendment and Response filed May 14, 2018, 19 pages.
U.S. Appl. No. 14/640,573, Amendment and Response filed May 30, 2017, 10 pgs.
U.S. Appl. No. 14/727,226, Office Action dated Jun. 22, 2017, 12 pages.
U.S. Appl. No. 13/834,496, Notice of Allowance dated Apr. 27, 2017, 14 pgs.
U.S. Appl. No. 14/640,573, Office Action dated Feb. 15, 2017, 21 pgs.
Paul McFedries, "Windows 7 Visual Quick Tips", Pub. Date: Oct. 5, 2009, Wiley Publishing: Visual, Print ISBN: 978-0-470-52117-5, p. 32-33.
U.S. Appl. No. 13/834,496, Amendment and Response filed Mar. 8, 2017, 8 pgs.
PCT International Search Report and Written Opinion in International Application PCT/US2016/054572, dated Feb. 28, 2017, 16 pgs.
Roth, Corey, "Using OneNote with the Surface Pro 3", Published on: Jul. 14, 2014 Available at: http://blogs.msdn.com/b/mvpawardprogram/archive/2014/07/14/using-onenote-with-the-surface-pro-3.aspx, 12 pgs/.
"COP Command Palette", Retrieved on: Sep. 16, 2015 Available at: https://chrome.google.com/webstore/detail/ccp-command-palette/cofhcenpbdpcjghambdchdmdlapaiddh?hl=en, 4 pgs.
Singh, Gursimranjeet., "ReBoard: Revolutionary Keyboard", Published on: Sep. 12, 2015 Available at: https://itunes.apple.com/us/app/reboard-revolutionary-keyboard/id984982881?mt=8, 4 pgs.
"Final Office Action Issued in U.S. Appl. No. 14/726,868", dated Jun. 27, 2019, 26 Pages.
"Final Office Action Issued in U.S. Appl. No. 14/840,360", dated Jun. 20, 2019, 18 Pages.
"Office Action Issued in European Patent Application No. 15801540.4", dated May 29, 2019, 4 Pages.
"Final Office Action Issued in U.S. Appl. No. 14/727,226", dated Jul. 9, 2019, 10 Pages.
"First Office Action and Search Report Issued in Chinese Patent Application No. 201580060247 5", dated Sep. 2, 2019, 11 Pages.
"Non Final Office Action Issued in U.S. Appl. No. 14/727,226", dated Dec. 6, 2019, 13 Pages.
"Final Office Action Issued in U.S. Appl. No. 14/840,360", dated Apr. 20, 2020, 22 Pages.
"Second Office Action Issued in Chinese Patent Application No. 201580060247.5", dated Mar. 16, 2020, 8 Pages.
"Non Final Office Action Issued in U.S. Appl. No. 14/640,573", dated Mar. 20, 2020, 21 Pages.
"Office Action Issued in Indian Patent Application No. 201747013813", dated Nov. 20, 2020, 7 Pages.
"Final Office Action Issued in U.S. Appl. No. 14/727,226", dated Aug. 12, 2020, 13 Pages.
"Non Final Office Action Issued in U.S. Appl. No. 14/840,360", dated Nov. 3, 2020, 19 Pages.
"Non Final Office Action Issued in U.S. Appl. No. 14/727,226", dated Feb. 22, 2021, 15 Pages.
"Non-Final Office Action Issued in U.S. Appl. No. 14/840,360", dated Sep. 27, 2019, 19 Pages.
"Office Action Issued in Korean Patent Application No. 10-2017-7015390", dated Oct. 30, 2021, 13 Pages.
"Final Office Action Issued in U.S. Appl. No. 14/727,226", dated Aug. 26, 2021, 15 Pages.
"Non Final Office Action Issued in U.S. Appl. No. 14/727,226", dated Feb. 15, 2022, 18 Pages.
"Notice of Allowance Issued in Korean Patent Application No. 10-2017-7015390", dated May 4, 2022, 7 Pages.

* cited by examiner

500

600

Examples of Open State Positioning for Application Command Control

USER INTERFACE FOR APPLICATION COMMAND CONTROL

PRIORITY

This application claims the benefit of U.S. Provisional Application No. 62/076,368, filed on Nov. 6, 2014, which is hereby incorporated by reference in its entirety.

BACKGROUND

Smaller processing devices typically have smaller display space as compared to larger processing devices. Despite the limited display space, users of such smaller processing devices expect application command control of a mobile application to operate at a functionality that is at on par with a functionality of an application command control executing on larger processing devices. Furthermore, users typically value consistency in presentation and functionality of an application command control which can present challenges when display space is limited. It is with respect to such general technical areas that the present application is directed.

SUMMARY

Non-limiting examples of the present disclosure describe an application command control user interface menu to facilitate user interaction between a user and a mobile application. An application command control menu is displayed on a display screen of a processing device. In examples, the application command control menu may be displayed at the bottom portion of the display screen or at a side portion of the display screen. However, one skilled in the art should recognize that the application command control menu may be programmed to display on any portion of the display screen. An input may be received into an application canvas of a launched application. The application canvas may be positioned above the application command control menu on the display screen. In response to a received input into the application canvas, a soft input keyboard application may be displayed. The soft input keyboard application may display below the application command control menu on the display screen. A selection may be received in the application command control menu. In response to the received selection, display of the application command control menu may be expanded to replace display on the soft input keyboard application on the display screen. Other examples are also described.

In other non-limiting examples, other user interface interactions are described for displaying an application command control menu on a display screen of a processing device. A palette of an application command control menu on may be displayed on a display screen of a processing device/system. The palette may be vertically scrollable and includes a plurality of application command controls displayed in one or more rows of the palette. Input may be received into an editable portion of the palette. In response to the received input, a soft input keyboard application is invoked on the display screen. In examples, input may be received into the soft input panel keyboard application and data corresponding with the received input may be inserted into the editable portion of the palette.

Furthermore, other non-limiting examples describe user interface interactions involving a pane such as a comment pane. An application canvas for a launched application is displayed on a display screen of a processing device. A comment pane may be displayed on the display screen, where the comment pane is usable for entering a comment to attach to content displayed in the application canvas. Input may be received that places a focus point in the comment pane. In response to the received input, a soft input keyboard application is displayed on the display screen. The display screen may be updated to replace display of the application canvas with display of the comment pane and display the soft input keyboard application below the comment pane. However, one skilled in the art should recognize that a launched application may be programmed to update display, including placement of user interface objects, in any manner.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
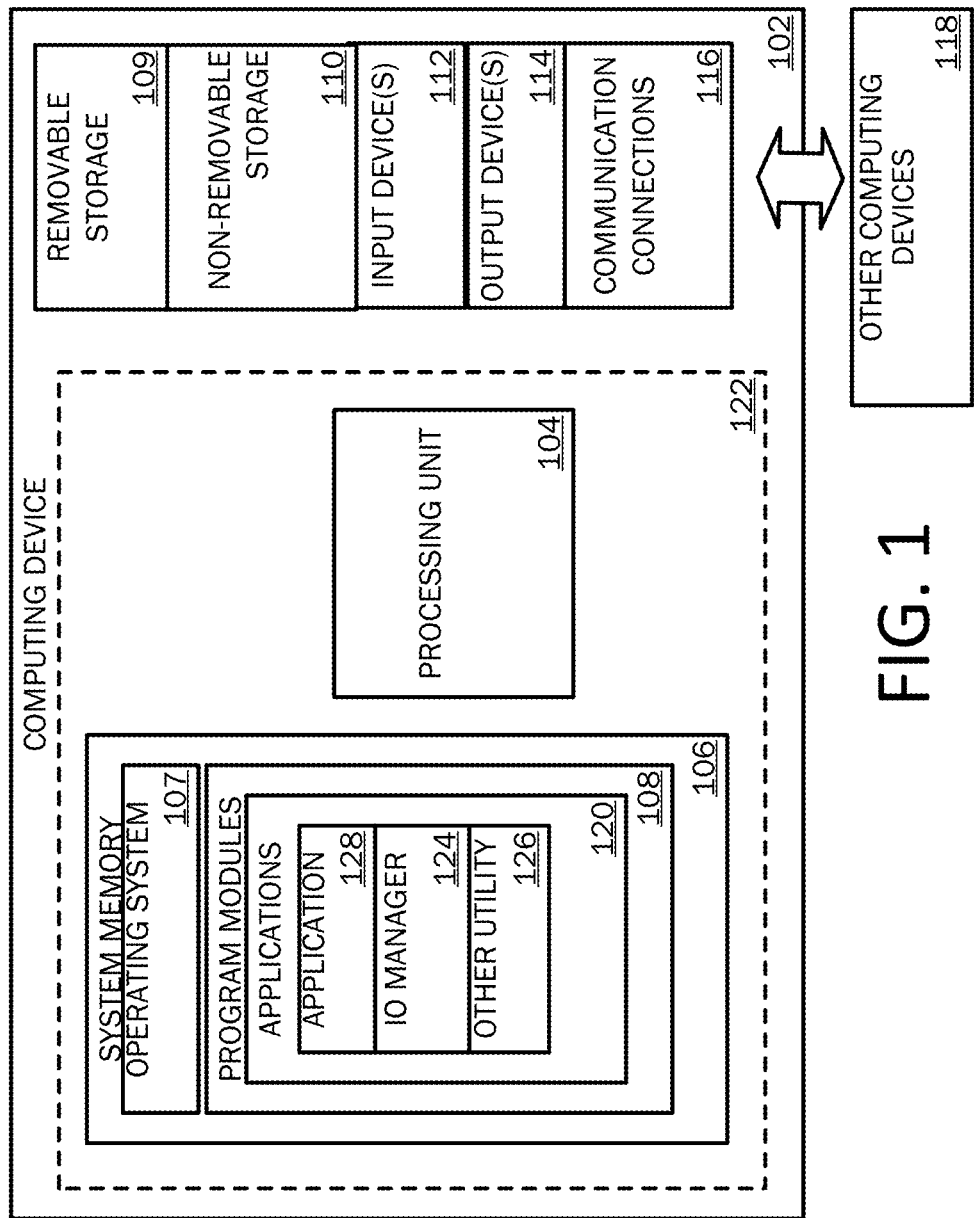
FIG. 1 is a block diagram illustrating an example of a computing device with which aspects of the present disclosure may be practiced.

Users of processing devices desire applications to be optimized in a form-factor manner. User test studies suggest that users value familiarity and consistency in an application command control user interface, where knowledge of application command control from use on larger screen devices can be applied to application command control in a variety of other form factors. Simply attempting to merge a large screen version of an application with a small screen version of an application creates complications. As an example, when large screen versions of applications are executed on devices having smaller display sizes, the UI gets too crowded and touch targets become too small. User studies conducted identify that users expect a full featured application command control that has functionality being at least on par with application command control for devices having larger screen display (e.g., graphical control elements such as RIBBON). In many cases, users prefer to utilize a mobile device (e.g., smartphone, tablet, phablet slate, wearable computing devices, personal digital assistant, processing devices in vehicles, etc.) to get work completed as compared with using a larger processing device such as a personal computers, servers, etc.

Moreover, there are many functions of an application that users may not know how even exists or how to access and use such functions. In general, such an issue becomes more significant the deeper a command is buried in the command hierarchy. With limited display space on smaller screen devices, having too many layers of hierarchy for command control may negatively affect usability. A large number of commands for application control may be presented and available to a user of an application. Such commands need to be organized in a logical way in which a user can easily find and access a command to be applied. Furthermore, a 3-or-more tier command structure is painful or unusable for blind or vision impaired users. Studies conducted indicate that users need and desire direct access to commands instead of navigating through a complicated command hierarchy. Improved usability for users and improved interaction between a user and a processing device (via an application/application command control) are important technical considerations in developing application command control that is suitable for devices having smaller display screens.

Examples of the present disclosure describe an application command control user interface for mobile applications that provides functionality and familiarity for application command control while accounting for display space in a form factor manner. Examples described herein provide systems and methods of generating and displaying an application command control user interface menu that improves interaction with a user of a mobile application. An exemplary application command control user interface menu organizes a large set of application control commands in a graphical user interface representation. The application command control user interface menu is a user interface (UI) control that displays commands in nested groups and comprises a mechanism for navigating hierarchical groupings of application control commands, among other features. User studies conducted identified that users are receptive to UI surface adaptation and nesting of commands to provide functionality in a limited amount of display space. Thus, examples of the present disclosure consider UI surface adaption and nesting of commands to address technical difficulties of bringing functional and optimized application command control to mobile applications.

A number of technical advantages are achieved based on the present disclosure including but not limited to: efficient use of limited amount of display space, improved scalability of UI elements for applications, visually appealing and interactive presentation of application command control, enhanced processing capability across devices of varying display sizes including improved efficiency and usability for application command control, improved efficiency in navigation and access to control content, and improved user interaction with applications/application command controls, among other examples.

Figure 2A:
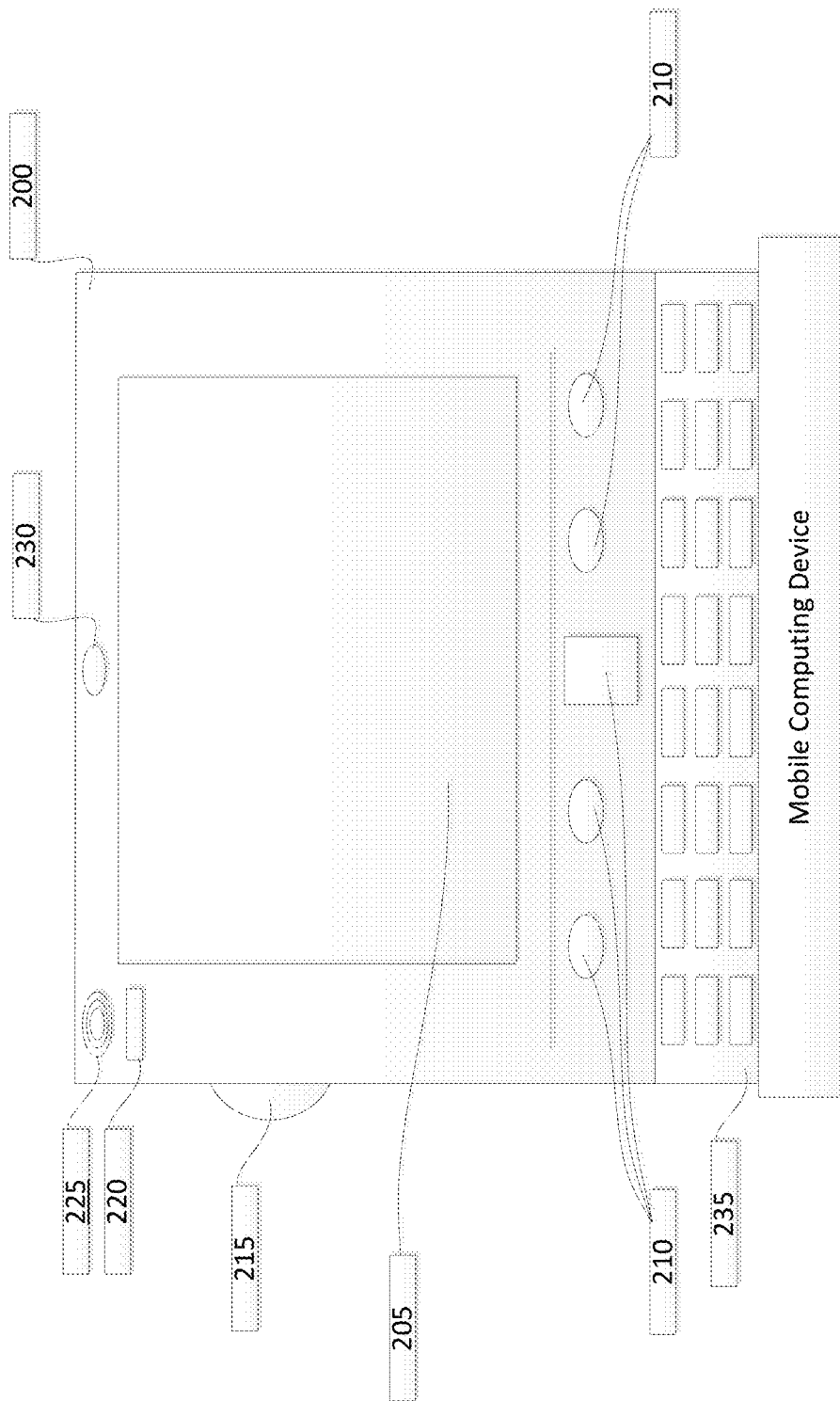
FIGS. 2A and 2B are simplified block diagrams of a mobile computing device with which aspects of the present disclosure may be practiced.
Figure 2B:
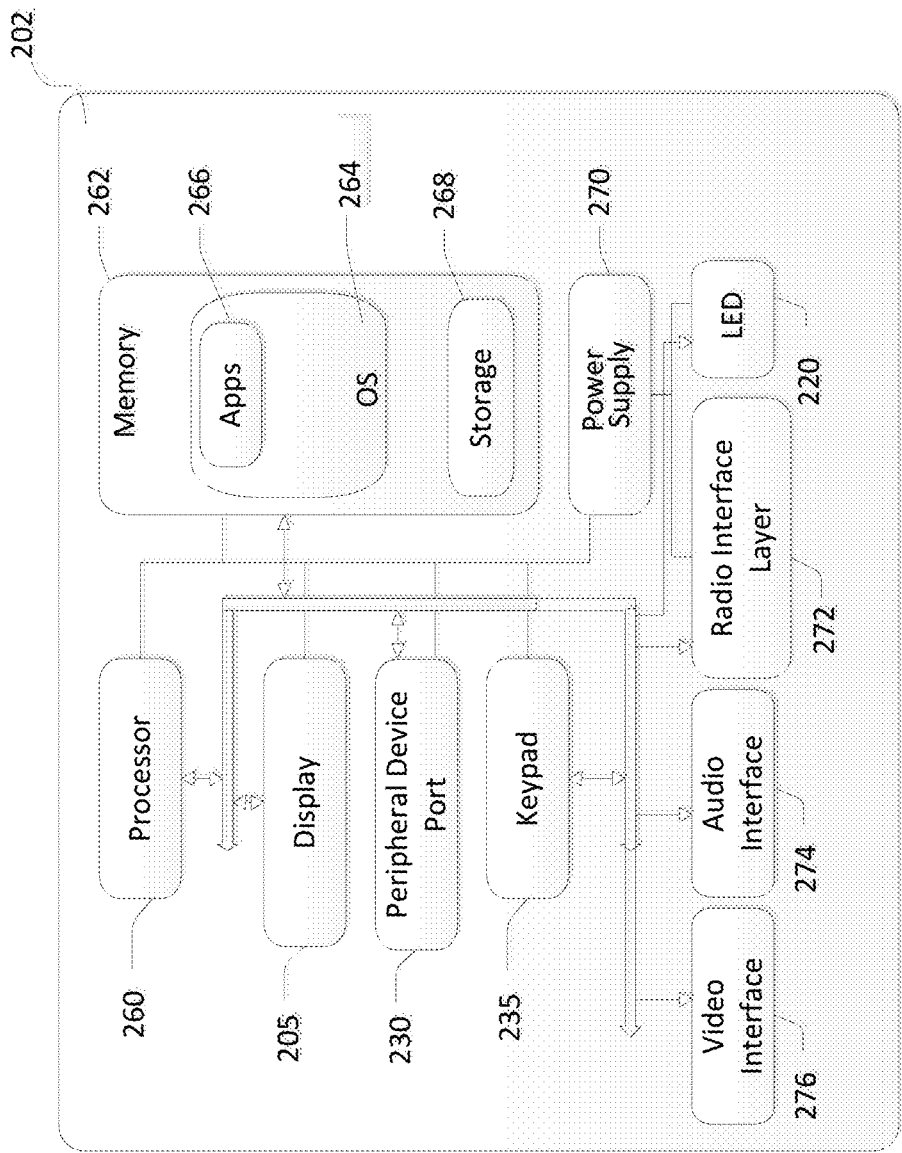
Figure 3:
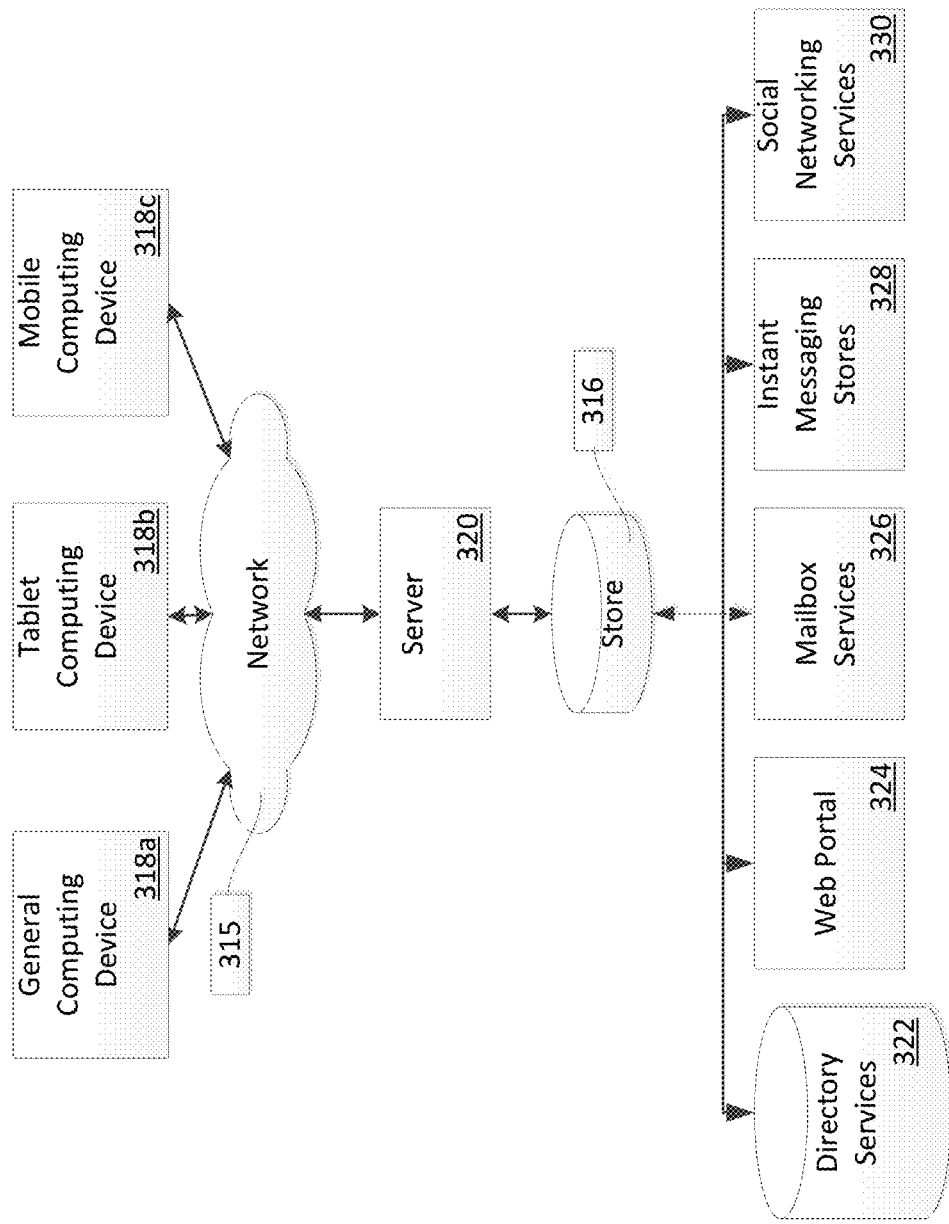
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. For example, mobile computing device 200 may be implemented to execute applications and/or application command control. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
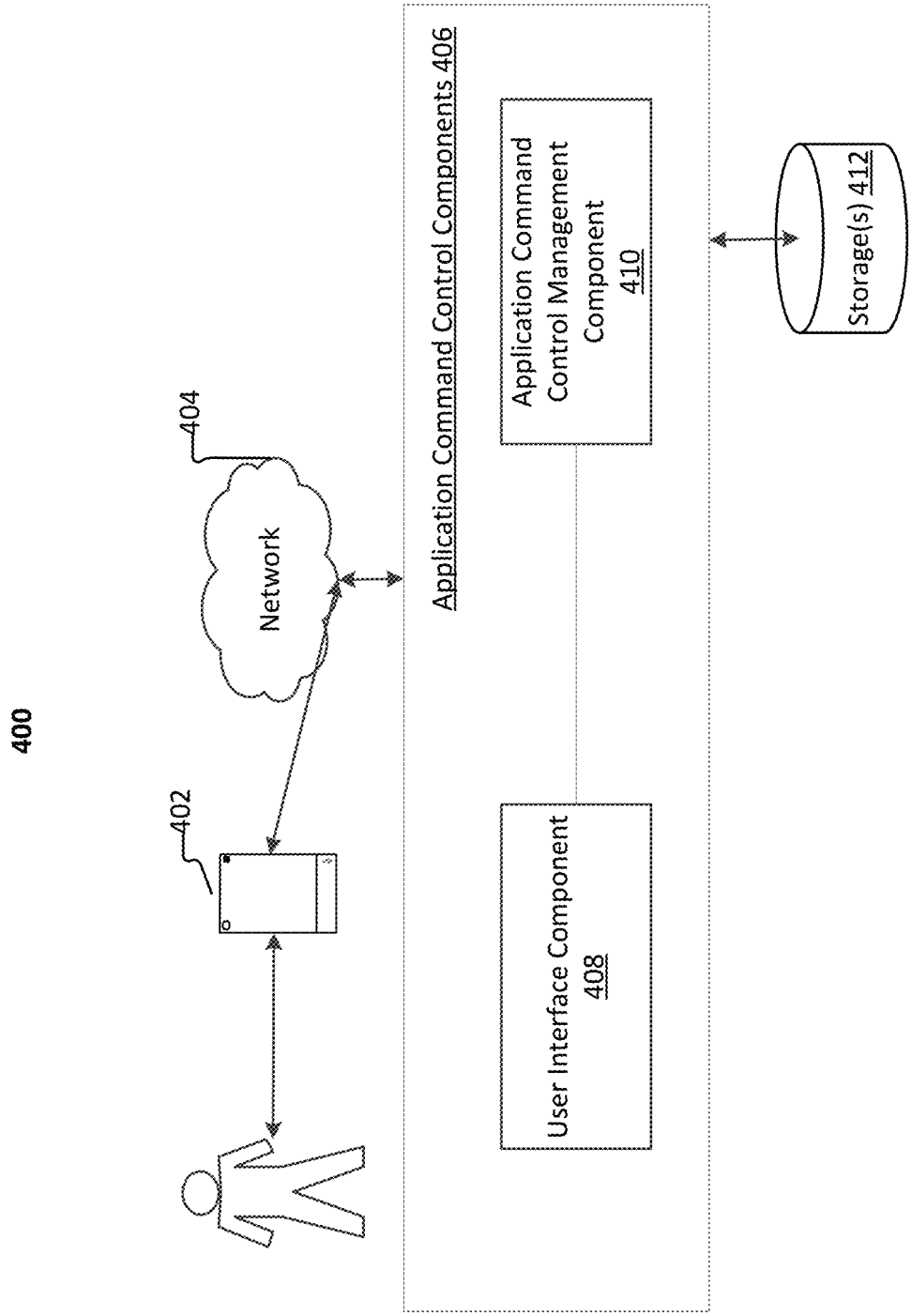
FIG. 4 is an exemplary system for managing exemplary user interface elements with which aspects of the present disclosure may be practiced.

FIG. 4 illustrates an exemplary system 400 implemented on a computing device for managing exemplary user interface elements with which aspects of the present disclosure may be practiced. Exemplary system 400 presented is a combination of interdependent components that interact to form an integrated whole for learned program generation based on user example operations. Components of system 400 may be hardware components or software implemented on and/or executed by hardware components of system 400. In examples, system 400 may include any of hardware components (e.g., ASIC, other devices used to execute/run operating system (OS)), and software components (e.g., applications, application programming interfaces, modules, virtual machines, runtime libraries, etc.) running on hardware. In one example, an exemplary system 400 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., phablet slate, wearable computing devices, personal digital assistant, processing devices in vehicles, etc.) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/ storages or other memory are associated with system 100. For example, a component of system 400 may have one or more data storages/memories/stores associated therewith. As an example, see storage 412, described in further detail below. Data associated with a component of system 400 may be stored thereon as well as processing operations/instructions executed by a component of system 400. System 400 comprises a processing device 402, a network connection 404, application command control components 406 and storage(s) 412. The application command control components 406 may comprise one or more additional components such as user interface component 408 and an application command control management component 410. Application command control components 406 may be components/ modules associated with application command control within a mobile application as described in the description of exemplary method 500 of FIG. 5 and exemplary method 600 of FIG. 6.

Processing device 402 may be any device comprising at least one processor and at least one memory/storage. Examples of processing device 402 may include but are not limited to: mobile devices such as phones, tablets, phablets, slates, laptops, watches, and other computing devices. While examples described herein may reference mobile devices, one skilled in the art will recognize that such examples are applicable to provide form factor application command control to processing devices of any size including personal computers, desktops computers, servers, etc. In one example processing device 402 may be a device of a user that is running a mobile application/service. A mobile application is any program/application (including web applications/ services) designed to run on mobile devices. One skilled in the art will recognize that examples provided herein are not limited to mobile applications and can be applied to provide application command control for any application. In examples, processing device 402 may communicate with application command control components 406 via a network 404. In one aspect, network 404 is a distributed computing network, such as the Internet.

The application command control components 406 are a collection of components that are used for managing interaction between a user and an application command control for an application (e.g., mobile application). Application command control components 406 comprise a user interface component 408 and an application command control management component 410. The user interface component 408 is one or more components that are configured to enable interaction with a user of an application or service associated with an application such as a mobile application. Transparency and organization are brought to users of such an application/service through the user interface component 408 where a user can interact with an application and/or application command control user interface menu. The application command control management component 410 interfaces with the user interface component 408. In one example, the user interface component 408 is implemented on processing device 402 to facilitate user interaction. However, one skilled in the art will recognize that any processing device can be configured to perform specific operations of the user interface component 408. In some aspects, the user interface component 408 may send/receive information and commands via a client processing device to a server device (e.g., distributed system) for processing. In examples, the user interface component 408 is configured to operate as a client-based application service that may not require connection via network 404 in order to be operable. In examples of system 400, the user interface component 408 may interface with at least one storage 412 to enable display and processing of UI elements such as in UI elements arranged in an application command control UI menu. Storage 412 may store computer-executable instructions, programs, modules, etc. to enable an application to launch and display a user interface for application command control.

The application command control management component 410 is one or more components that manage interaction between a user and an application such as mobile application. Example operations performed by the application command control management component 410 comprise but are not limited to operations related to: interfacing with the user interface component 408, launch and display of an application command control UI menu, receipt and processing of input for managing interaction with a user of an application, organization and control within the application command control UI menu, behavioral control of UI elements and features of application command control UI menus, and identification of selected content within an application and management of an application command control UI menu based on a relationship with content of the application, among other examples. Refer to the description of exemplary method 500 (of FIG. 5) and exemplary method 600 (of FIG. 6) for further description related to operations performed by the application command control management component 410. In examples of system 400, the application command control management component 410 may interface with at least one storage 412 to enable processing associated with an application/service operating on a processing device such as processing device 402. Storage 412 is an example of system memory 106 described in the description of FIG. 1. However, storage 412 may be any component (e.g., hardware or software) for storing information that is computer-readable.

Figure 5:
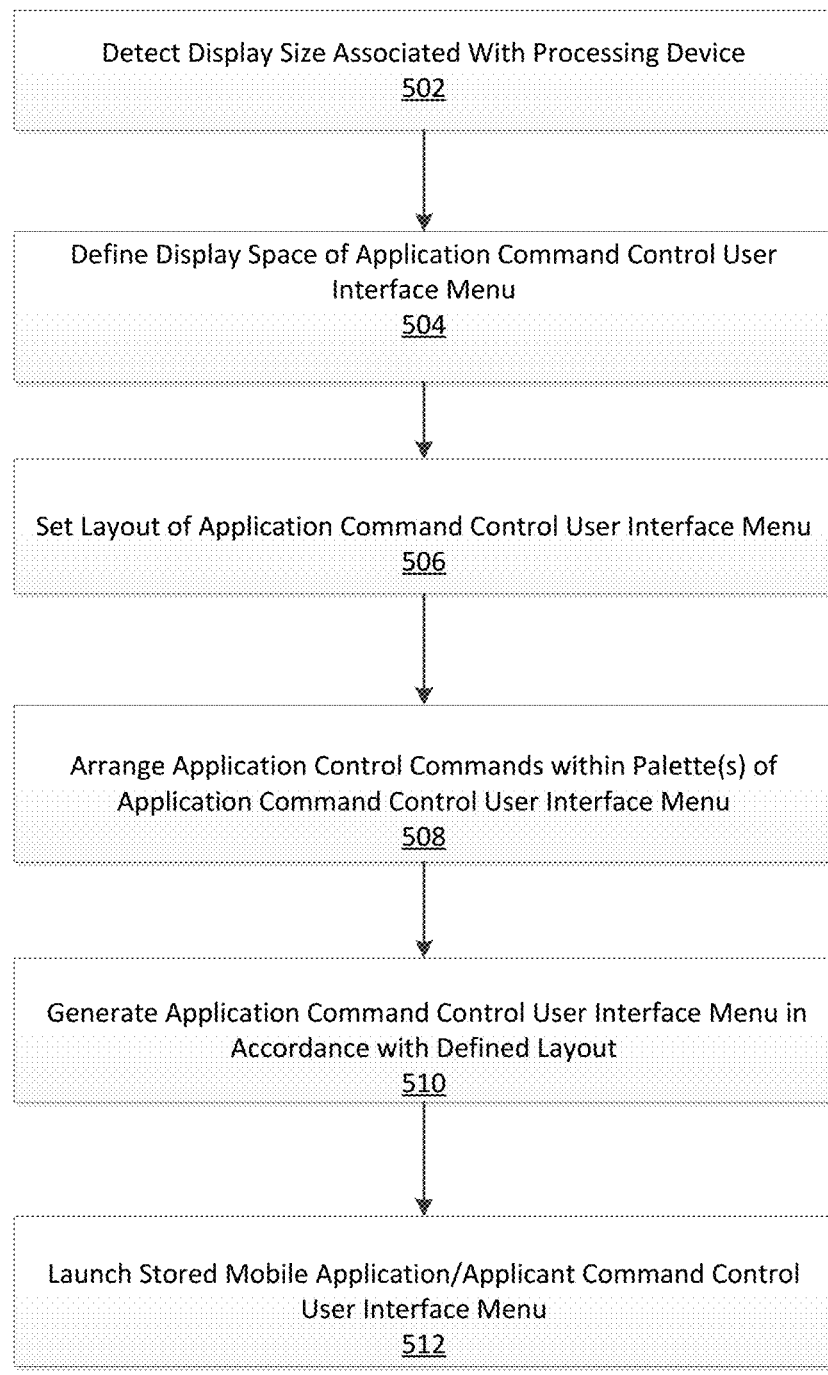
FIG. 5 is an exemplary method for display of an exemplary user interface element with which aspects of the present disclosure may be practiced.

FIG. 5 is an exemplary method 500 for display of an exemplary user interface element with which aspects of the present disclosure may be practiced. As an example, method 500 may be executed by an exemplary system such as shown in FIGS. 1-4. In examples, method 500 may be executed on a device comprising at least one processor configured to store and execute operations, programs or instructions. However, method 500 is not limited to such examples. In at least one example, method 500 may be executed (e.g., computer-implemented operations) by one or more components of a distributed network, for instance, web service/ distributed network service (e.g. cloud service).

In examples, method 500 may be performed in associated with an application. An application is a software component that executes on the processing device, interfacing with hardware and software components of the device. An application comprises one or more programs designed to carry out operations and is associated with a UI. As an example, an application may be a mobile application that operates on processing devices having a display screen size less than or equal to a threshold value. One skilled in the art should recognize that the threshold value can be determined by developers of an application/application command control and may vary over time. In examples, an application may comprise a UI that is usable to control an application. In examples, the UI is presentable through a user interface component such as the user interface component 408 described in the description of FIG. 4. In examples, a UI may comprise an application command control. An application command control is a graphical control element that interfaces with an application that executes on the processing device (e.g., memory, processor and functions of mobile device) and software components such as an operating system (OS), applications executing on a mobile device, programming modules, input methods (e.g., soft input panel (SIP)) and command container such as a pane or contextual menu, among other examples. As an example, an application command control is used to control execution of actions/ commands for the application. An SIP is an on-screen input method for devices (e.g., text input or voice input), and a pane is a software component that assists function of other software running on the device such as the OS and other software applications, among other examples. In some examples, an application command control may be integrated within an application. For instance, an application command control may be able to be launched, closed, expanded or minimized when an application is launched, closed, expanded or minimized. In other examples, an application command control is executable as its own application that interfaces with another application. For instance, an application command control may be able to be launched, closed or minimized separately from the launching of an application that is controlled by the application command control.

The application command control may be arranged in an organized manner such as an application command control UI menu. An application command control UI menu provides one or more groupings of sets of commands (presentable to users as UI elements). As an example, commands may be organized and presented to a user in nested groups that are generated and organized in a form factor manner. For instance, groupings of commands may vary based on a size of a display or available display space for application command control, among other examples. Commands of the application command control UI menu may be organized in one or more palettes. A palette may be an organization of tabs. A tab is a selectable UI element providing access to one or more application command commands. As an example, the application control commands nested within a tab may all be related. However, one skilled in the art should recognize that commands can be nested or grouped in any manner that may improve interaction with a user. The application command control UI menu further provides functions for a user of an application to navigate through UI elements of the application command control UI menu. For instance, a component of the application command control UI menu may be a palette switcher that improves interaction with a user by enabling the user to easily switch between tabs of a palette. As an example, the application command control UI menu may be able to be navigated by switching palettes. In examples, the application command control UI menu may intelligently interface with content of an application. For example, in response to selection of content within an application, the application command control UI menu may update display to provide a user with application command controls that are relevant to the selected content. That is, the application command control UI menu may provide an extensibility model for command groups that enable discovery of groups of commands that may be only available in certain situation. For instance, one or more groupings of commands or palettes of tabs/commands may appear in a display space for the application command control UI menu when the user selects content that may make additional commands available.

In examples, functionality of tabs of the application command control UI menu may improve user interaction for application command control while executing an application. As an example, when an application is initially launched, one or more tabs may be visibly displayed to the user but not activated until the user selects a tab or modifies content within the application that is associated with application command control of the tab. Functionality of tabs may further comprise a lingering behavior model. A lingering behavior model remembers the state of a tab when content is selected/deselected or a state of the application command control UI menu is modified, thus improving usability of application command control. In such examples, the application command control UI menu may return display for the user to a tab (or a drilled-in version of the tab). For instance, if an application is minimized and the user returns to the application, display of the application command control UI menu including a previously highlighted tab may be restored. In some examples, a state of the application command control UI menu may not be retained or remembered in cases where application sessions have changed, an application is closed or other situational occurrences defined by developers of the application command control U menu. In examples, lingering behavior model functionality may be customizable by developers and/or end-users.

The application command control UI menu enables users to find and access commands to be applied to content within an application, and improves interaction between a user and an application whereby examples may provide benefits comprising but not limited to: arranging application command controls within one surface, grouping commands by any of similarity, familiarity, alphabetically, most frequently used, etc. In examples, most frequently used application command controls (by one or more users) or most popular application command controls, as determined by one or more users of an application command control through use cases or user studies, may be displayed at the top, for example, of the application command control UI menu. However, one skilled in the art should recognize that emphasis of application command controls may be provided in any manner that the developers identify which may improve usability of application command control. In examples, a home palette (comprising one or more tabs for selecting application control commands) may display a grouping of default application command controls. Default application command controls may be set by developers of the application command control UI menu or customizable by users/user activity including based on historical command usage data obtained from use of the application command control UI menu.

Method 500 begins at operation 502 where a display size associated with a processing device is detected. A processing device may be any device comprising a display screen, at least one memory that is configured to store operations, programs, instructions, and at least one processor that is configured to execute the operations, programs or instructions such as an application/application command control. As an example, a processing device may be processing device 402 described in FIG. 4. Display size is a measurement of viewable area for display on a processing device. As an example, display size is a measurement associated with active viewable image size of a processing device. In other examples, display size may be associated with a nominal size value. In one example, detecting of the display size comprises detecting a measurement value for screen diagonal of a display of a processing device. In another example, detecting of the display size comprises detecting a display width (e.g. width of the display for the processing device or operating size of a display window for an application executing on the processing device). Examples of a display size may comprise physical image size or logical image size, among other examples. Operation 502 may comprise a program instruction or module that can identify and evaluate system specifications for a processing device such as a mobile device. In one example, the programming instruction implemented in operation 502 identifies a type or version of the processing device and executes a fetch of data to identify system information of the processing device. In another example, a programming instruction or module may reference manufacturer specification information to determine a value associated with display size of a processing device.

Factors that may be evaluated to determine a display size include but are not limited to: dot density (e.g., dots per inch (DPI), pixel density (e.g., pixels per inch (PPI), physical size of a screen/display, screen diagonal of a display of a processing device, use case distance of a display from a user, display length, and display width, among other examples. As an example, display size may be a measurement value associated with effective resolution of a display for a processing device. Measurement of effective resolution enables is an example of a value used to evaluate display form factors with a common metric, and enables UI scaling to be classified into different display classes. However, one skilled in the art will recognize that any common metric relative to display size can be applied in exemplary method 500. In alternative examples, other factors other than display size may impact UI adaptation. Examples include but are not limited to: processing device orientation, processing device operational mode (e.g., keyboard mode, touch mode, handwriting/ink mode, etc.), window size, screen aspect ratio, and screen effective resolution, among other examples.

In examples, operation 502 may further determine a display class for launching of a mobile application based on the detected display size of a processing device. Display class determination provides an abstraction for determining the size of a display. A display class can be defined for processing devices having display sizes that fall within the range associated with the display class. Code can query display class information to determine a UI instance to instantiate depending on the display size of the processing device that an application is running on. That is, display classes act as transition points for UI experiences, providing form factor representations of the application command control UI menu. For instance, different versions of applications may be generated to provide tailored UI experience for a user based on display sizes of the processing device upon which an application is to execute. As an example, display class is a value that may be determined based a maximum display size. The value for display class may be in any form including numeric values and elements of speech, as examples. For instance, display classes may be set to correspond with different types of processing devices (e.g., laptops, PCs, tablets, phones, etc.) where an exemplary display class may be "<=Phone" or "<=Tablet". In another example, display classes may be set based on numeric values. For example, a display class may be identified using numeric values (e.g., 0 to 3 inches). In any examples, display classes are used to classify processing devices in accordance with display size. For example, a display class may be set for processing devices having a display size falling in a range from 0 to 3 inches where another display class may be set for processing devices having a display size in a range from 3.1 to 5 inches, and so on. A range for values of display classes may fall between 0 and infinity. In one example, operations for display class determination are written in style of successive less than or equal to (<=) checks, with an else for everything greater than a defined display class. In this example, additional display class designations may be easily added without having to change operational code behavior. However, one skilled in the art will recognize that display class designations including minimum and/or maximum values for ranges of display classes can be defined in any possible way that can be useful in defining user interface interaction. In examples, a minimum value of a display class may be a value that is equal to or greater than a maximum value of a display class which is directly smaller than the display class being defined. For instance, as in an example above, a first display class may correspond to a range for devices having displays between 0 and 3 inches and a minimum value of a second display class may take into account a maximum value of the first display class (e.g., 3 inches) and set the minimum value of the second display class at 3.1 inches, for instance. Display classes may be changes over time based on programmer prerogative, analysis/testing/use cases, etc.

Operation 502 may comprise one or more programming operations for determining an active display class or a display class for a device that may execute a mobile application and application command control. In one example, an application programming interface (API) utilizing a shared library of data (e.g., dynamic link library (DLL) is used to determine a display class. As one example, exemplary operational code associated with a display class determination (e.g., display class event) is not limited to but may be similar to:

```
/** Interface to register against for display class change events */
struct IDisplayClassInformation : public Mso::IRefCounted
{
public:
/** Returns the event store for display class change events. This event store may be invoked -
Whenever the running application changes to a different display with a new display - Whenever
the active display changes its DPI */
virtual DisplayClassChangedEvent& DisplayClassChanged( ) = 0;
virtual DisplayClass GetCurrentDisplayClass( ) const = 0;
};
/** Get a DisplayClassInformation reference on the active UI thread */
MSOCPPAPI_(Mso::TCntPtr<Mso::DisplayClassInformation::IDisplayClassInformation>)
MakeDisplayClassInformation( );.
```

Flow may proceed to operation 504 where a display space of an application command control UI menu is determined. As an example, operation 504 may define a display space for one or more application command control UI menus based on a display size determined in operation 502. As an example, launching of a version of a mobile application may be based on a detected display size of a processing device that is executing the mobile application. For instance, a display size of a processing device to execute an application may be a certain size and there may be a certain size available for display of an application. Within that available display space for application display, there may be a portion of the display that is made available for application command control. Operation 504 may perform operations to define a display space for application command control UI menu. For instance, a defined or predefined display space for the application command control UI menu may be determined based on a detected display size, where the predefined display space may be a set portion of the display screen that is allocated to presentation of the application command control UI menu while the application is open and executing. In some examples, launching/re-launching of the application command control UI menu may be in a minimized state (described in further detail in the description of FIG. 11). In other examples, launching/re-launching of the application command control UI menu may be in an open state (described in further detail in the description of FIG. 12). In alternative examples, a defined size of display space for application command control UI menu may customizable by a developer or end-user of an application.

In some examples, determination of a defined display space may occur based on identification of a display class associated with a processing device that may execute or is executing an application. For instance, a display size associated with a processing device may fall within a display class classification where a display space for the application command control UI menu may be determined and/or set based on the display class. One skilled in the art should recognize that defined display space for the application command control UI menu may vary depending on the size of display available for application use. For instance, defined display space for application command control/UI elements may be different for a device having a display size of inches as compared to a device having a display size of 5.5 inches despite that both of those example processing devices may fall in a same display class designation. Alternatively, in other examples, a defined display space for application command control/UI elements may be set the same for any device in a defined display class.

Defining (operation 504) the display space may comprise determining a height and/or width is determined for defined display space of the application command control UI menu within an application. As an example, programming operations may be applied to set a layout for an application command control UI menu based on at least one of the following factors: the defined display space, a determined display size, and display class designation. Operation 504 may comprise execution of programming operations associated with a programming rule set or UI definition data that may be set based on a determined display size (e.g., of a processing device to execute the application) or a classification of a detected display class (identified based on the display size). For instance, a programmer or developer may set UI definition data (e.g., set of computer-readable instructions) based on a display size and/or display class associated with a processing device upon which an application is to execute. The determined height is an amount of space a palette takes up length-wise on a display of a processing device when the application command control UI menu is in an open state displaying the palette within the defined space of the application. The determined width is an amount of space a palette takes up from side to side on a display of a processing device when the application command control UI menu is in an open state displaying the palette within the defined space of the application. In one example, height/width values of a palette are set by a program developer of the UI and may be specified in a rule set based on a display class rule to generate a form factor UI representation for application command control. In one example, users of the UI may be prevented from resizing a defined display space. In another example, height/width of the defined display space may be adjustable, for example during operation by a user. In any example, height/width of the defined display space may be set for cases where the UI is displayed in different states (e.g., open state, minimized state, invisible state, etc.). In different states, a height/width of a palette may be set to a predetermined value within the defined display space. For instance, a palette height may be set to a percentage (e.g., 55%) of a height of a display for the application when the application command control UI menu is operating in an open state. In another example, a height of the defined display space may be set to different percentage (e.g., smaller percentage) of a display when the application command control UI menu is operating in a minimized state. In examples, a height of the defined display space may be set as a percentage or as a fixed number of pixels. Height or width values of the defined display space may also be conditional based on launching of other software components by the OS such an SIP, and panes. For example, conditions may be set such as when the application command control UI menu sits above an SIP or below a pane, height/width for a palette within the defined display space is equal to the remaining available defined display space. When a software component such as an SIP or pane is closed or minimized, this may adjust the height and/or width of display of a palette within the defined display space. In one example, opening of another component such as an SIP or pane may cause the application command control UI menu to adjust its state. For instance, UI definition data may define rules for display of other UI elements such as an SIP or Pane and how display of such other UI elements affects display of the application command control UI menu. As one example, display of an SIP may cause the application command control UI menu to transition to a minimized state in order to make best use of limited display space that may be available. However, one skilled in the art should recognize that this is just one non-limiting example and developers may program rules that may impact display of an application command control UI menu based on an interaction with a user.

Flow may proceed to operation 506, where a layout of the application command control UI menu is set. Operation 506 may comprise determining a maximum number of rows of UI elements for a palette of the application command control UI menu based on the defined display space available for the application command control UI menu. Operation 506 may further comprise determining a maximum number of UI elements per row may be determined for a palette of the application command control UI menu. In some examples, operation 506 may further comprise determining a number of palettes to include in the application command control UI menu. As an example, programming operations may be applied to set a layout for an application command control UI menu based on at least one of the following factors: the defined display space, a determined display size, and display class designation. Operation 506 enables an UI developer to best layout palettes and UI elements for users given the limited space that may available on processing devices. In operation 506, scaling for display of UI elements in UI palettes may be a programming operation associated with a programming rule set or UI definition data that may be set based on the defined display space and at least one of the determined display size or detected display class. For instance, a programmer or developer may set UI definition data (e.g., set of computer-readable instructions) based on a display size and/or display class associated with a processing device upon which an application is to execute. As an example, evaluation of a display size of a processing device may determine that a diagonal of a display for a processing device is four inches wide, and the display of the processing device has a resolution that is 360 pixels in width by 640 pixels in length. Thus, the UI definition data may be programmed to determine that for a display having an effective pixel width of 360 pixels, a maximum of 8 rows should be displayed each having a maximum of 4 commands per row. In another example, evaluation of the processing device may determine that a diagonal of a display for a processing device is 5.5 inches wide, and the display of the processing device has a resolution that is 512 pixels in width by 853 pixels in length, displaying up to 12 rows and up to 6 commands per row of commands in palettes based on rule sets applied for the detected size/display class.

Figure 8:
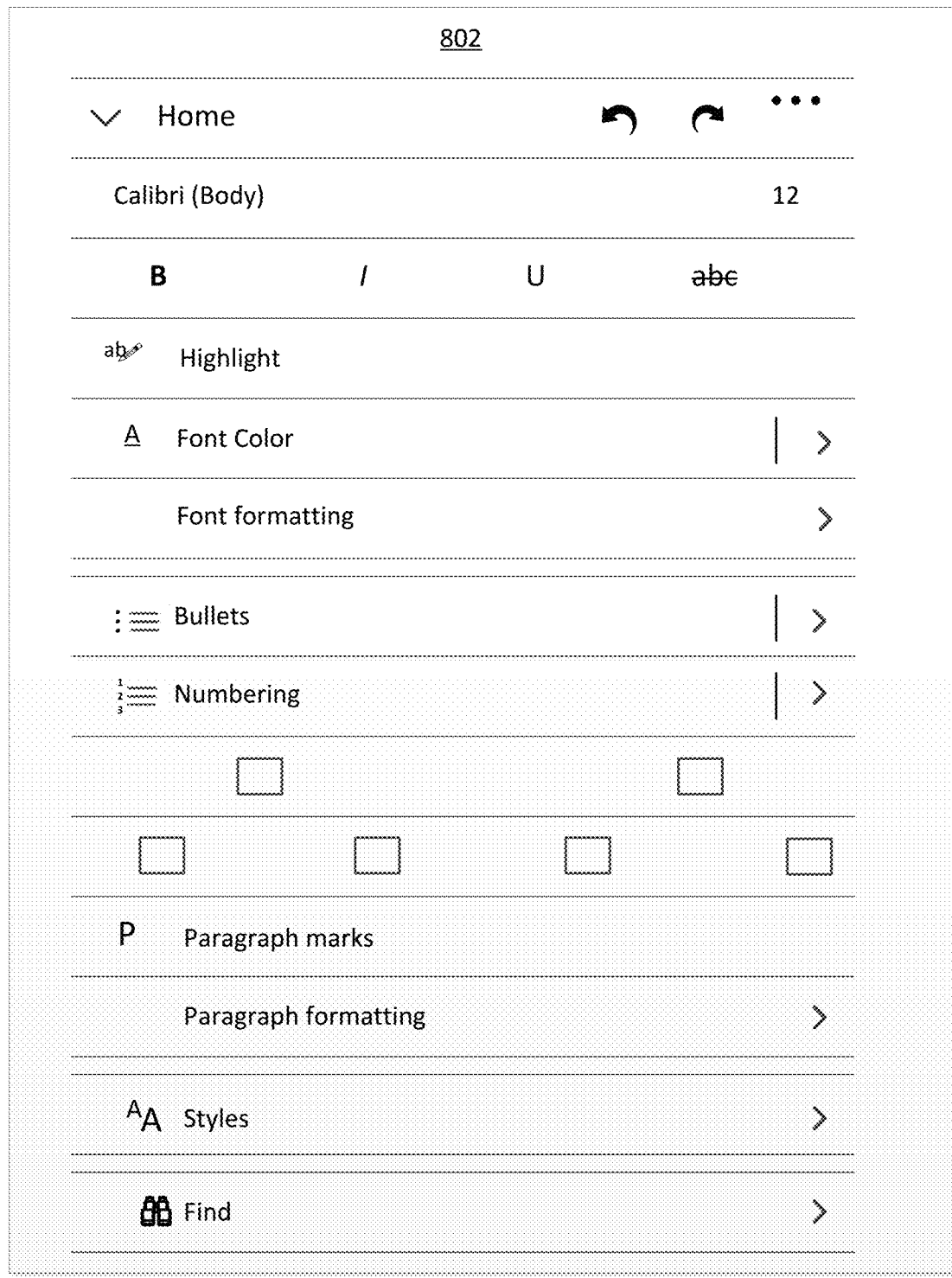
FIG. 8 is a diagram illustrating user interface examples with which aspects of the present disclosure may be practiced.
Figure 9:
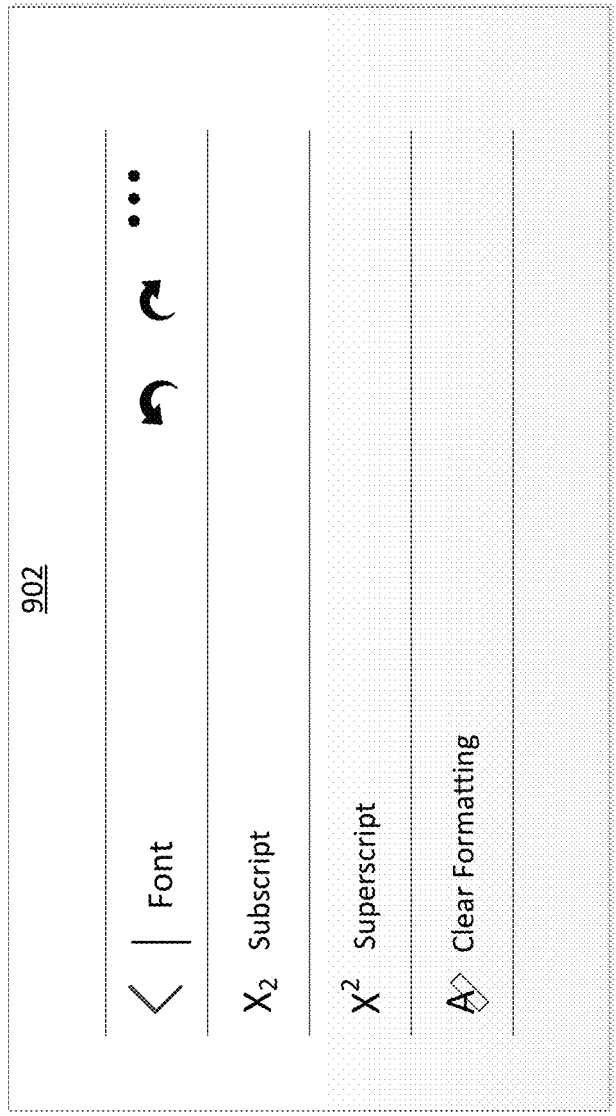
FIG. 9 is a diagram illustrating user interface examples with which aspects of the present disclosure may be practiced.

Flow may proceed to operation 508 where application command controls are arranged within one or more palettes of the application command control UI menu. In operation 508, size, style and layout of UI elements may be determined for a UI palette of the application command control UI menu. Operation 508 enables an UI developer to best layout palettes and UI elements for users given the limited space that may available on processing devices. In operation 508, scaling for display of UI elements in UI palettes may be operations determined based on a programming rule set or UI definition data specifically applied based on the defined display space and at least one of the determined display size or detected display class. For instance, UI definition data (e.g., set of computer-readable instructions) may be applied based on a display size and/or display class associated with a processing device upon which an application is to execute. Arranging (operation 508) of UI elements within palettes of the application command control UI menu comprises setting a layout for at least one UI palettes such as a top-level palette and/or drill-in palette. Each of the top-level palettes and the drill-in palettes is a collection or grouping comprising one or more selectable UI elements for application command control. An exemplary top-level palette is shown in FIG. 8 and described in the description of FIG. 8. An exemplary drill-in palette is shown in FIG. 9 and described in the description of FIG. 9. Operation 508 may utilize UI definition data in determining a layout of a UI palette. A UI definition may specify how programmed command objects can be grouped or nested and actual layout of the command objects as UI elements may be set by applying a display class rule set associated with a determined display class, for example. In examples, UI definition data may comprise command grouping data being information relating to the grouping of command objects including associations between command objects. For example, text editing features such as bolding, underlining, italicization, superscript and subscript may be associated and commonly used. Ideally, a UI palette would like to include all of these commonly used functions in the same palette. However, due to limitations on the screen size, certain commands may need to be separated. Command grouping data of the UI definition data is information that identifies associations and what commands should or should not be separated from each other. For example, it may be determined that the maximum number of rows and commands allows displaying of text formatting commands including a superscript editing command in a top-level palette but would not also allow displaying of a subscript command. Using the command grouping data, it may be identified that from a functionality and/or usability standpoint, that it is best not to separate the superscript and subscript editing commands. For instance, a user who makes a subscript text edit may later look to make a superscript edit or visa-versa. Thus, in setting the layout of commands for palettes, operation 508 may take into account command grouping data of UI definition data to determine an optimal UI display window that accounts for the display size of a device upon which the UI is displaying. In one example, operation 508 may generate an application command control UI menu that displays a higher-level command for text editing in a top-level palette and the superscript and subscript editing commands may be included in a drill-in palette (child palette) of that top-level palette (parent palette) so they such commands remain associated.

Flow may proceed to operation 510 where a mobile application comprising the application command control UI menu is generated for display with the defined display space of an application such as a mobile application. Operation 510 may generate the application command control UI menu based on a defined layout determined by performing operations 504, 506 and 508, for example.

Flow may then proceed to operation 512 where the generated application command control UI menu is within the launched version of an application. In some examples, a version of the application may be a version suitable for operation on a mobile processing device. As identified above, there may be a plurality of versions of the application for mobile devices that can be generated to provide application command control in a form factor manner that accounts for display size of a processing device that may execute the version of the application. In one example, a version of the mobile application may be launched on a processing device such as processing device 402 through a web-based application/service hosting one or more versions of the mobile application. In another example, a version of a mobile application may be transmitted to and stored upon a processing device. In that example, when a version of the mobile application is launched, the application command control UI menu may be generated. In examples, UI definition data may be retained for launching a version of the mobile application on a processing device where when a prior detected processing device attempts to execute the mobile application, the appropriate form factor version of the mobile application may be displayed.

In some examples, launching (operation 512) may determine that a mobile application is to be launched based on a threshold value determination of a display size of a processing device. In examples the threshold value corresponds to identification of small screen processing devices or an operating environment that is suitable for small screen application command control. The threshold value may be set at any predetermined value related to a size of a display of a processing device including but not limited to: total screen size, width, length, and screen diagonal, pixels, effective pixels and resolution, and operating size of a display window of an application, among other examples. As an example, the threshold value may correspond to the display width of a display for the processing device. For instance, the threshold value for a display width may be set to 512 effective pixels. A display width of 512 effective pixels could correspond to a device having a screen diagonal of less than 6 inches or 152.4 millimeters. However, one skilled in the art will recognize that the threshold value (e.g., for display width) can any criteria that is predetermined and can change for example, as sizes of processing devices change over time. A version of the mobile application is launched based on the detected display size of the processing device in response to detecting that the display size is less than or equal to a threshold value. As an example, the version of the mobile application that is launched is a version that presents a form factor application command control UI menu programmatically designed for operation on the processing device based on the display size of the processing device. In some cases where a processing device has a display size larger than threshold value, a notification may be presented for the user to launch a version of the application programmatically designed for larger screen devices. Alternatively, a version of an application may be launched that is programmatically designed for larger screen devices (e.g., devices about the threshold value determination).

Figure 6:
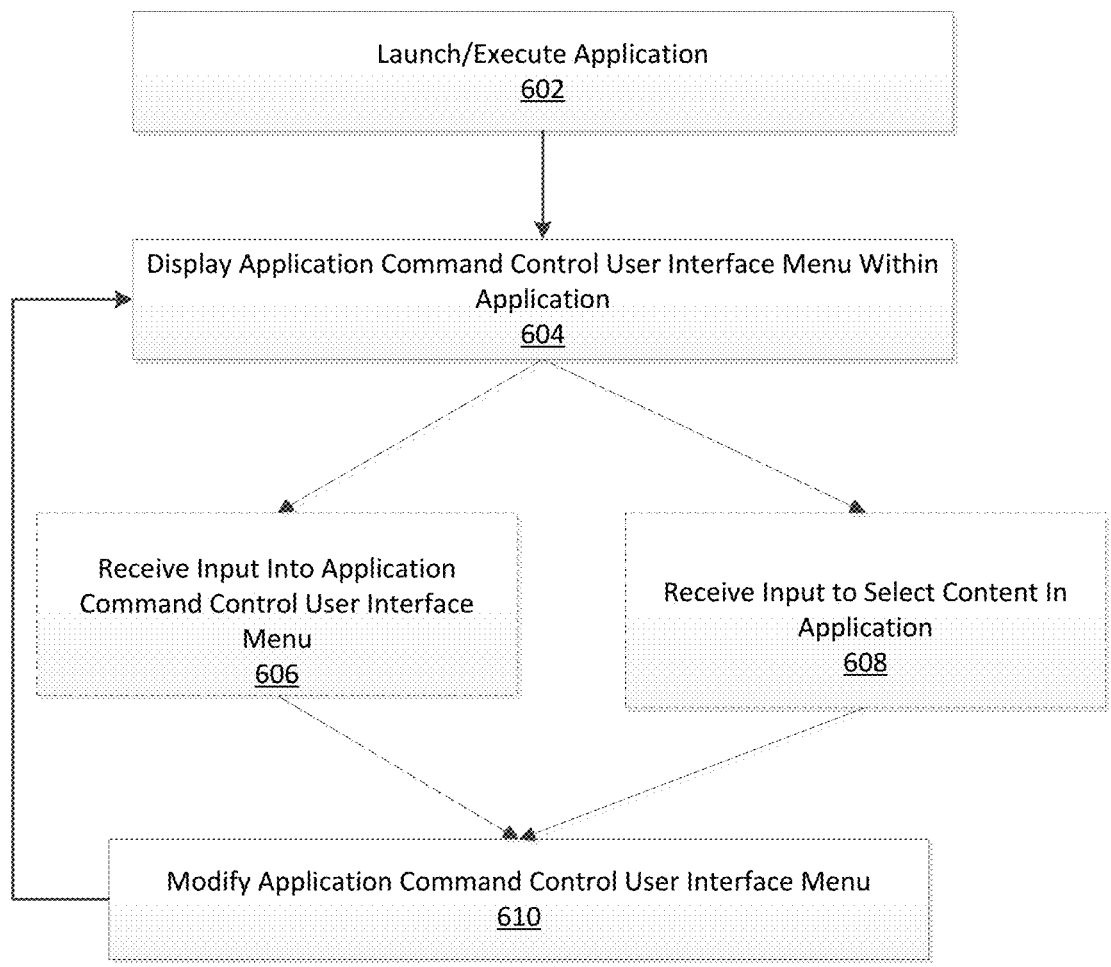
FIG. 6 is an exemplary method for interaction with an exemplary user interface element with which aspects of the present disclosure may be practiced.

FIG. 6 is an exemplary method for interaction with an exemplary user interface element with which aspects of the present disclosure may be practiced. As an example, method 600 may be executed by an exemplary system such as shown in FIGS. 1-4. In examples, method 600 may be executed on a device comprising at least one processor configured to store and execute operations, programs or instructions. However, method 600 is not limited to such examples. In at least one example, method 600 may be executed (e.g., computer-implemented operations) by one or more components of a distributed network, for instance, web service/distributed network service (e.g. cloud service). In examples, method 600 may be performed in associated with an application and/or application command control.

Flow of method 600 begins at operation 602 where an application is launched. In one example, the application launched in operation 602 is version of the application such as a mobile application. Launching of an application such as a mobile application is described above in the description of method 500 of FIG. 5. As identified above, a plurality of versions of the application may be available for launch based on identification of a display size of a processing device that is to execute the application. For instance, a plurality of versions of a mobile application may be available for execution on a plurality of processing devices. In operation 602, any of the versions of an application may be launched for display on a processing device. In one example, a display size of a processing device to execute the application may be detected. In a case where the display size is less than or equal to a threshold value, operation 602 may comprise launching a mobile application. The launched mobile application may comprise an application command control UI menu that is generated for form-factor display based on a display size of the processing device launching the mobile application.

Figure 11:
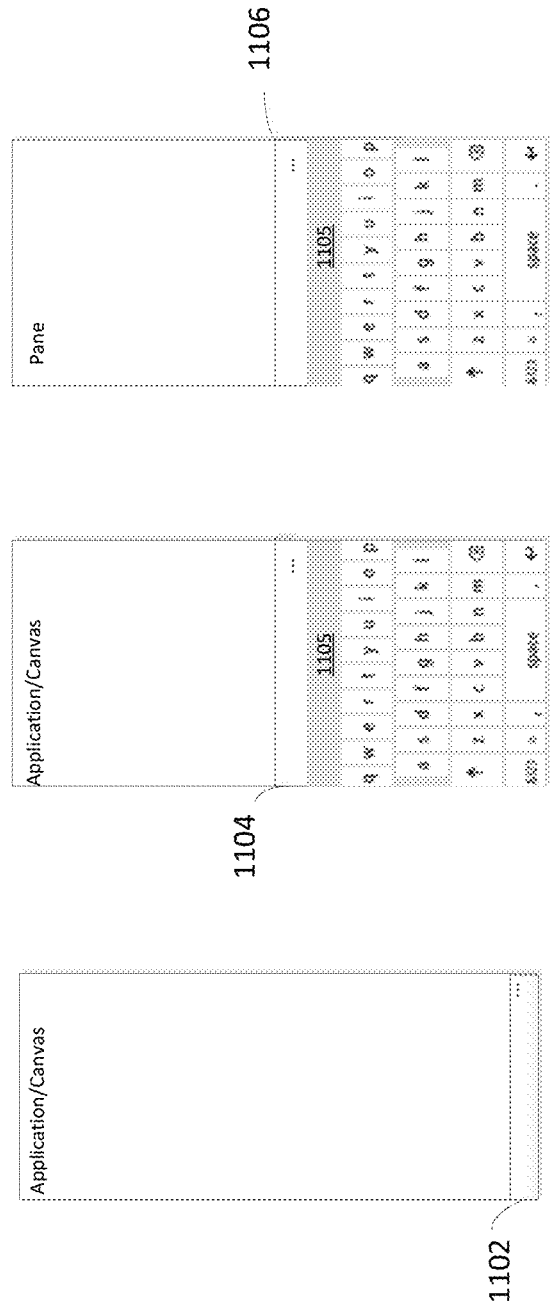
FIG. 11 is a diagram illustrating examples of positions of an application command control user interface menu in a minimized positioning with which aspects of the present disclosure may be practiced.
Figure 12:
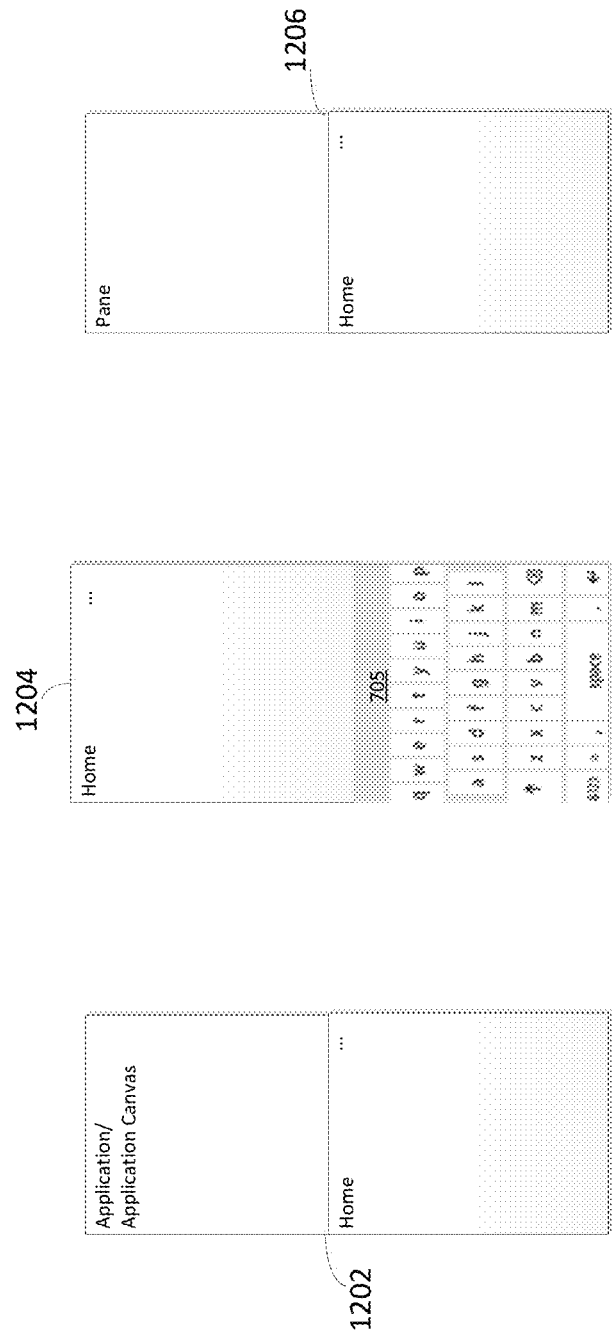
FIG. 12 is a diagram illustrating examples of positions of an application command control user interface menu in an open position with which aspects of the present disclosure may be practiced.

Flow may proceed to operation 604 where the application command control UI menu is displayed. In one example, initial launch of the application command control UI menu displays the application command control UI menu in a minimized state. An example of a minimized state of the application command control UI menu is illustrated in FIG. 11 and described further in the description of FIG. 11. In another example, the application command control UI menu may be launched in an open state. An example of an open state of the application command control UI menu is illustrated in FIG. 12 and described further in the description of FIG. 12.

Processing flow of method 600 may depend on an input received by a user through a user interface of an application. For instance, flow may proceed to operation 606 if an input is received within the application into the application command control UI menu or flow may proceed to operation 608 if input received within the application is to select content in the application. In examples, a user interface component of an application may be programmed to manage interaction with a user to process application command control. An example of a user interface component is user interface component 408 described in the description of FIG. 4. In an example, the application command control UI menu may be displayed in a minimized state, for example, in a case including but not limited to: where the application is initially launched, the user has minimized the application and returned back to the application, and the user has minimized the application command control UI menu either through selection of a user interface element to minimize the application command control UI menu or through action in using the application. Input received in operations 606 and 608 may be in any form including but not limited to: touch (e.g., any actions such as pressing, swiping, scrolling, etc.), voice/audio, text input, handwritten input, and action selection (e.g., mouse click, stylus, etc.), among other examples.

In an example where input received (operation 606) into the application command control UI menu, flow proceeds to operation 610 where the application command control UI menu is modified. For example, a received input (operation 606) may be input to expand the application command control UI menu. In that example, operation 610 comprises action to transition the application command control UI menu by expanding the application command control UI menu to an open state. In that example, the application command control UI menu expands to fit the defined display space within the application such as the mobile application. In another example, operation 606 may comprise receiving input to select a tab within the application command control UI menu. In that example, operation 610 may comprise modifying display of the application command control UI menu within the defined display space based on the received input. As identified above, tabs may comprise a hierarchy of application control commands. Application control commands may be grouped/sub-grouped. In one instance, operation 606 may be a received input to drill into a sub-group (e.g., child group) of a higher level tab. For instance, a selection of font color may be selected as a tab, where operation 610 may comprise modifying display of the application command control UI menu to provide display of a plurality of font colors to manipulate content of the application. In yet another example, operation 606 may comprise receiving selection to switch between palettes of the application command control UI menu. In that example, operation 610 may comprise updating display of the application command control UI menu to change between palettes of the application command control UI menu based on the received input.

Figure 14:
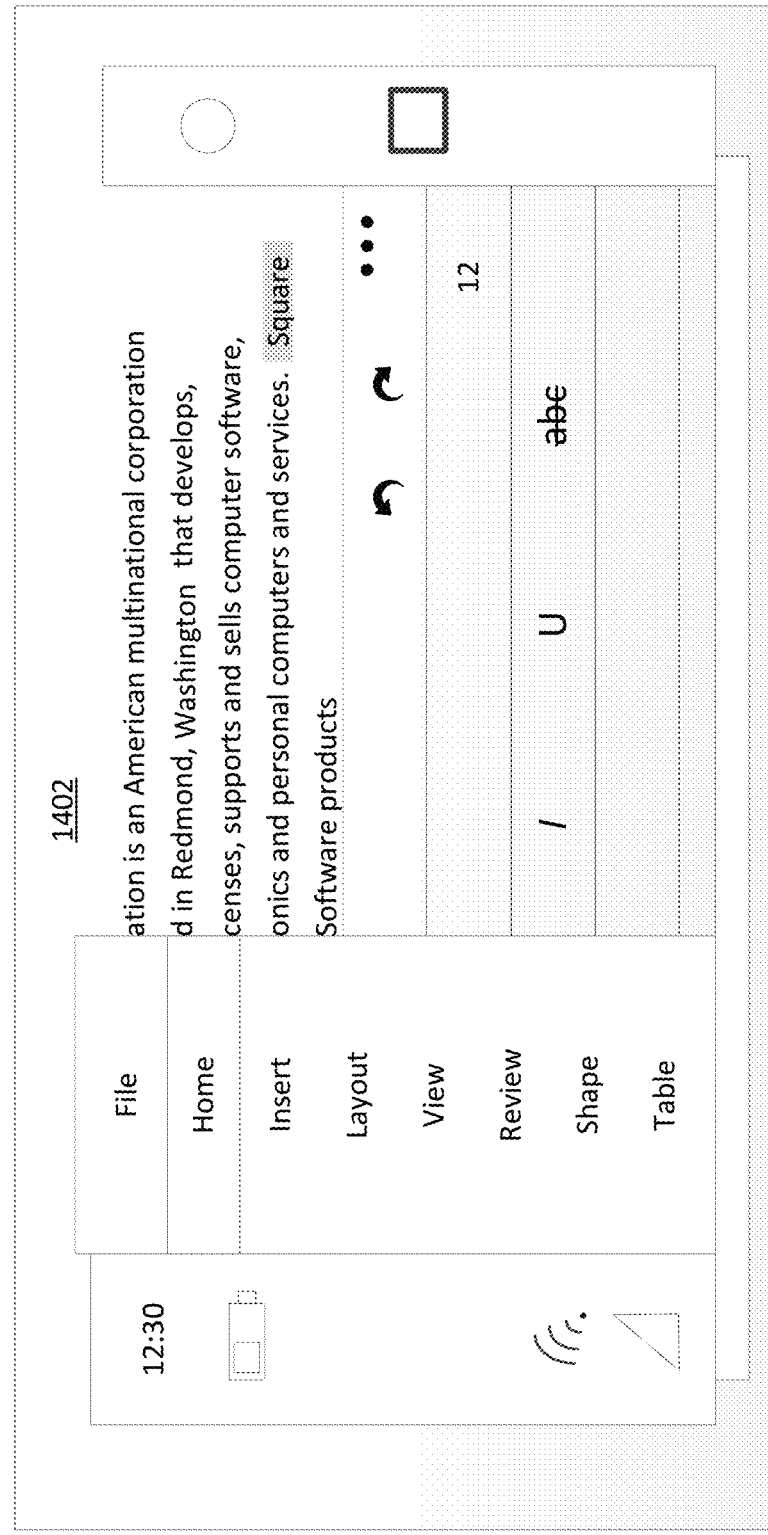
FIG. 14 illustrates a display including an exemplary application command control user interface element with which aspects of the present disclosure may be practiced.

In other examples, input received (operation 608) is selection of content within an application where flow proceeds to operation 610. In operation 610, the application command control UI menu is modified based on the content selected within the application. In that example, operation 610 may comprise modifying display of the application command control UI menu to display and highlight and/or select a tab for manipulating the selected portion of content. As an example refer to FIG. 14 illustrating a case where selection of a portion of content (such as a "square" shape) may highlight one or more tabs or palettes that can be used to manipulate content within the application. In examples, tabs and content within the application command control UI menu can dynamically change based on application content that the user is working with or alternatively through interaction with user interface elements within the application command control UI menu.

In some examples, a set of core tabs may be continuously presented and available for a user. Application developers and programmers may determine which tabs may be included in a set of core tabs. In one example, when a user selects content within an application, new tabs may be displayed or added to the display of the set of core tabs. In examples, when a new tab is presented, the application command control UI menu comprises presentation through display effects that enable the user to easily notice a new tab is presented. For instance, a new tab is presented in a different color (or with added emphasis, etc.) to easily enable a user to identify that additional application control commands are made available.

In examples, any palette (comprising one or more tabs) may provide access to a palette switching feature to allow a user to manage the application command control UI menu and switch between palettes and/or tabs. The application command control UI menu may comprise one or more portions that may be positioned within defined display space to maximize a user experience. For instance, in some cases, certain UI elements of the application command control UI menu may displayed on a top of display space for an application, on a bottom, a side, etc. In examples, switching between tabs and/or palettes of the application command control UI menu may occur through a pop-over surface that efficiently utilizes the defined display space to navigate between parallel groups of commands and/or tabs. In an example, when a new palette of the application command control UI menu is selected or a UI feature such as the palette switcher is selected, the new palette and/or selected features replace may replace display of previously selected features, for example by a visual representation such as a pop-over effect. In such a way, commands can be adaptively displayed within the define display space as well as dynamically changes based on a device size (e.g., processing devices having varying display sizes).

Figure 7:
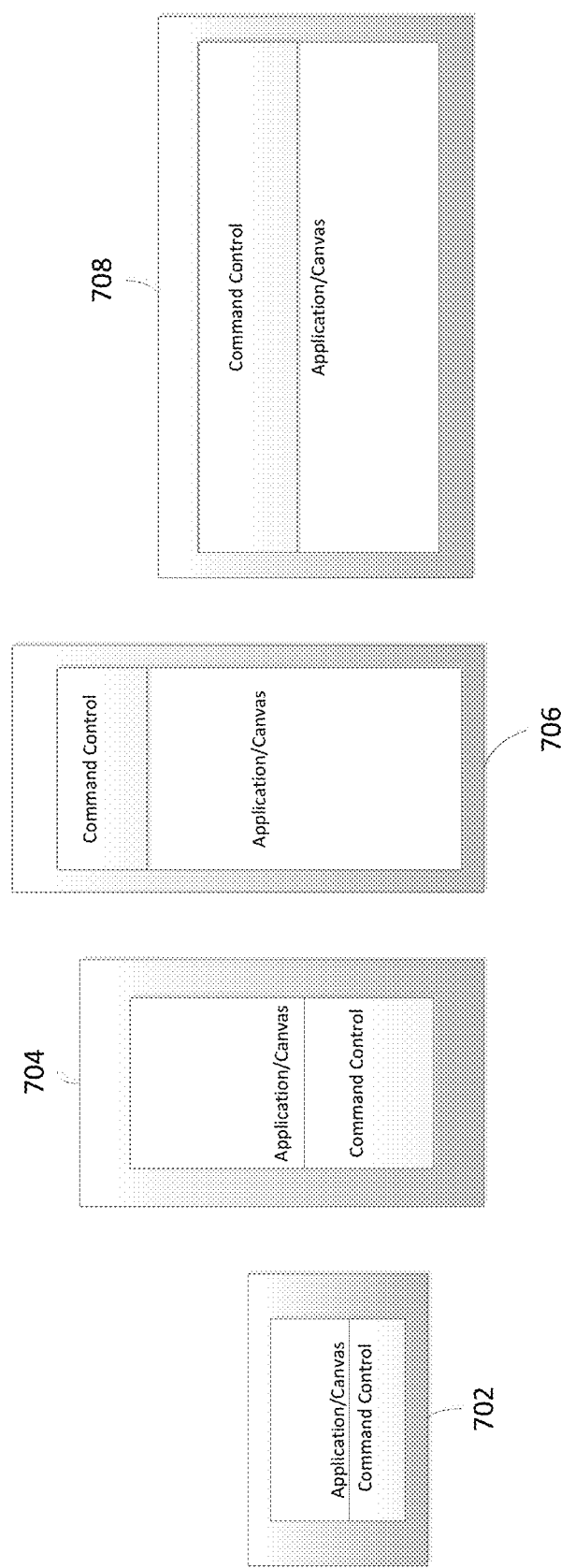
FIG. 7 is a diagram illustrating display for exemplary processing devices of different sizes with which aspects of the present disclosure may be practiced.

FIG. 7 is a diagram illustrating display for exemplary processing devices of different sizes with which aspects of the present disclosure may be practiced. Examples shown in FIG. 7 comprise processing devices having varying sizes and/or varying screen/display sizes, for example processing device 702, processing device 704, processing device 706 and processing device 708.

As shown in FIG. 7, an application command control and an application/canvas are displayed in exemplary processing devices 702-708. An application command control and an application/canvas are examples of components of a UI with which the present disclosure may apply. In examples, the UI is programmed to efficiently scale itself to utilize display space of processing devices of different sizes and/or operating size of display windows. For example, presentation of the application command control and/or application/canvas may vary across the different processing devices 702-708. An application command control and/or an application/canvas may be scaled according to a determined display class associated with a processing device.

An application/canvas is a portion of a display of a processing device that is designated for display of an application executing on the device. The application/canvas region is the application UI that shows effects implemented by actions executed via an application command control. That is, the application/canvas is the content consisting of but not limited to the pages in workspace or editable portions of an application.

An application command control hosts a majority of an application's command set, organized in a hierarchical structure of individual palettes, chunks, and commands. Examples of application command control comprise the application command control UI menu previously described. An application command control such as the application command control UI menu comprises a plurality of palettes (command palettes) programmed for application control. In one example, palettes of an application command control comprise top-level palettes and drill-in palettes. Each of the top-level palettes and the drill-in palettes is a collection or grouping of rows comprising one or more selectable commands or command elements. As an example, a top-level palette may comprise a highest level grouping of commands or functionalities and including commands that are more frequently used/more likely to be used by users. A top-level palette may display command listings that can be drilled into and displayed in drill-in palettes. FIG. 8 illustrates an exemplary top-level palette of an application command control. A drill-in palette is a collection or grouping of commands that may be used less frequently/or likely to be used less frequently compared to the commands displayed on a top-level palette. As an example, drill-in palettes host over-flow commands that, due to constraints resulting from a limited amount of display space for an application command control, are not included in a top-level palette. FIG. 9 illustrates an exemplary drill-in palette of an application command control. Using a word processing application as an exemplary application, a top-level palette may comprise high-level commands or functionality for text editing, font editing, paragraph formatting, word finder, spell-check etc.

that may be frequently called on by users. As an example, a drill-in palette for a word processing application may comprise sub-elements of such high-level commands of the top-level palette, for example, subscript or superscript commands for a font command/function. In examples, organization of palettes and commands may be editable, for example, where a command or given chunk of a palette can be pulled from one palette and added/displayed in another. For instance, an overflow command of a drill-in palette can be added to a top-level palette.

Organization or grouping of commands in palettes may also be based on command grouping data available to programmers of an application command control. Command grouping data is information relating to the grouping of commands including associations between commands. For example, text editing features such as bolding, underlining, italicization, superscript and subscript may be associated and commonly used. Ideally, the application command control would like to include all of these commonly used functions on the same palette. However, due to limitations on the screen size, certain commands may need to be separated. Command grouping data is information that identifies associations and what commands should or should not be separated from each other. For example, an application command control may determine that the maximum number of rows and commands allows displaying of text formatting commands including a superscript editing command in a top-level palette but would not also allow displaying of a subscript command. Using the command grouping data, it may be identified that from a functionality and/or usability standpoint, it is best not to separate the superscript and subscript editing commands. For instance, a user who makes a subscript text edit may later look to make a superscript edit or visa-versa. Thus, in setting the layout of commands for palettes, programmers of the application command control may display a higher-level command for text editing in a top-level palette and the superscript and subscript editing commands may be included in a drill-in palette (child palette) of that top-level palette (parent palette) so they are not separated from each other.

Examples of common components that make up a top-level palette include but are not limited to: a palette bar and palette title, palette switching feature (including one touch target that launches palette switcher from title of palette bar), command to dismiss palette (e.g., visual representation of ellipses), quick commands (e.g., undo or redo), palette canvas comprising a plurality of commands, chunk commands (e.g., groupings of commands) and chunk dividers (e.g., dividing different groupings of commands), drill-in features to access drill-in palettes (when applicable).

Examples of common components that make up a drill-in palette can include but are not limited to: a palette bar and palette title, command to navigate back to the parent palette, command to dismiss palette (e.g., visual representation of ellipses), quick commands (e.g., undo or redo), palette canvas comprising a plurality of commands, chunk commands (e.g., groupings of commands) and chunk dividers (e.g., dividing different groupings of commands).

In one example, palettes of an application command control are presented in a vertical layout. For example, a top-level palette and a drill-in palette are vertically scrollable and comprise a collection of rows comprising one or more selectable command elements. However, in other examples, setting of the layout of a palette may also comprise presenting commands in a horizontal layout where commands are horizontally scrollable. In some examples, no limit is set on the scrollable height of a palette. Scrolling position may be kept on top-level palettes when switching between top-level palettes however scrolling position may or may not be kept for drill-in palettes. Commands set and displayed may include labels identifying a command and may be configured to take up an entire row of a palette. In other examples, multiple commands may be displayed in one row of a palette. Scaling is applied to setting and displaying commands in palette rows. In some other examples, commands may not have labels, for example, commands that are well known or have images displayed that are well known to users. Separators or spacers (either horizontal or vertical depending on layout of palette) may be displayed to break up different commands or chunks of commands.

In FIG. 8, application command control 802 is an exemplary top-level palette. In FIG. 9, application command control 902 is an exemplary drill-in palette. For example, application command control 902 displays a drill-in palette of the top-level palette 802 shown in FIG. 8, where top-level palette 802 is a parent palette of the drill-in palette 902 (e.g., child palette of the top-level palette). As shown in application command control 802, a row showing a "font formatting" command includes a caret indicative of a drill-in feature. When the drill-in feature is selected, a drill-in palette of application command control 902 is displayed on a display of a processing device. As can be seen in application command control 902, font formatting command features "superscript" and "subscript" are displayed. In this way, application command control and/or an application/canvas may be scaled in accordance with a determined display class associated with a processing device.

Figure 10:
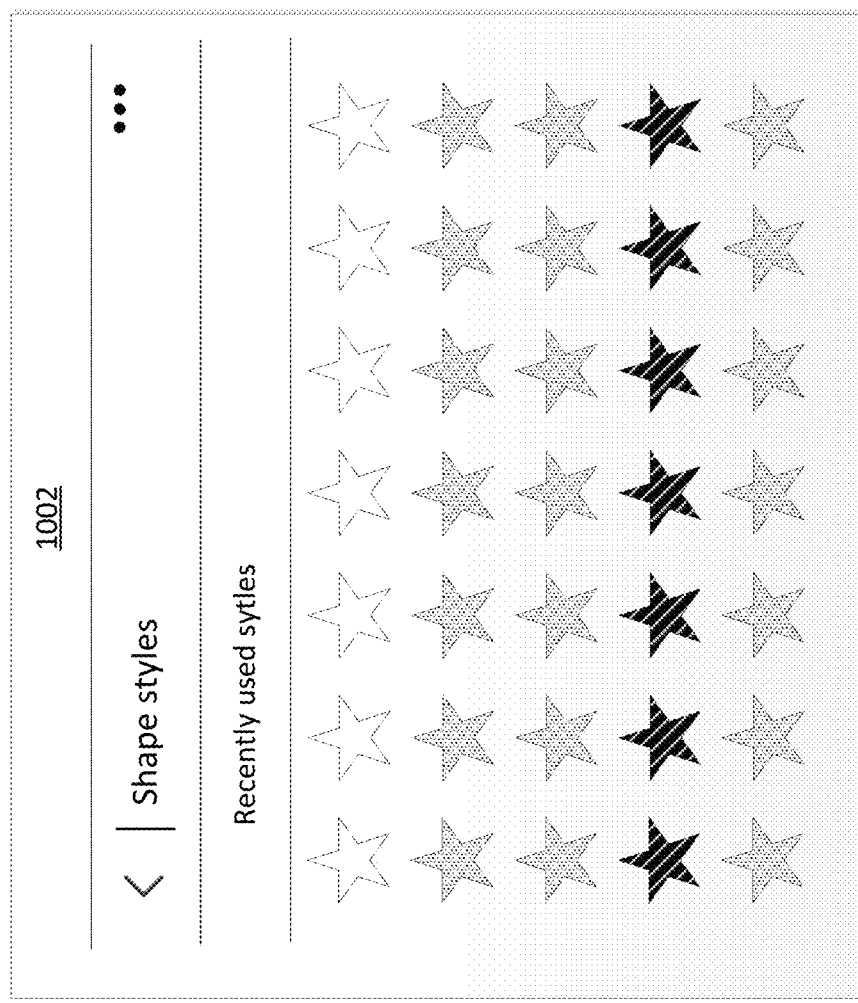
FIG. 10 is a diagram illustrating an example of application command control user interface element with which aspects of the present disclosure may be practiced.

FIG. 10 is a diagram illustrating an example of application command control user interface element with which aspects of the present disclosure may be practiced. In FIG. 10, application command control 1002 is an exemplary drill-in palette as described above in the description of FIG. 9. As shown in application command control 1002, a row showing a "shape styles" command includes a caret indicative of a drill-in feature. When the drill-in feature is selected in a top-level palette of for application command control 1002, a drill-in palette 1002 is displayed on a display of a processing device. As can be seen in application command control 1002, shape style image features can be selected and used in coordination with an application. As described in examples above, selection of content within the application may trigger display of application command control 1002 within the application command control UI menu described previously in the detailed description.

FIG. 11 is a diagram illustrating examples of positions of an application command control user interface menu in a minimized positioning with which aspects of the present disclosure may be practiced. Minimized positioning of the application command control such as the application command control UI menu may occur when the application command control UI menu is operating in a minimized state as shown in processing device views 1102 through 1106. Display of the application command control 1102 upon initial launch is shown in processing device view 1102 of FIG. 11. As shown in processing device view 1102, the application command control is docked at the bottom of the display of the mobile device, below an application/canvas being a portion of the application that is for display and manipulation of content. Processing device view 1104 shows that position of the application command control changes on the screen when an SIP (e.g., soft input keyboard) is presented on a display of a mobile device. As shown in processing device view 1104, positioning of the application in a minimized state is changed when the SIP is displayed, where the application command control is displayed above the SIP. Processing device view 1106 shows display of the application command control (in a minimized state), the SIP and a pane, sharing the display of a mobile device. As shown in processing device view 1106, the application command control is displayed below a pane. The pane is a software component that assists function of other software running on the mobile device such as the OS and other software applications, among other examples. One or more of the pane can be displayed on a display of a processing device that may interface with an application command control. Exemplary panes include but are not limited to: a navigation pane, a research pane, an editing pane, a control pane, a command pane, and a help pane, among other examples. In an example where both a pane and an SIP are displayed, the application command control is displayed above the SIP and below the pane. Although example positions of the application command control are illustrated and described with respect to FIG. 11, one skilled in the art will recognize that positioning of the application command control on a display of a mobile device is able to be variably controlled by a program developer.

FIG. 12 is a diagram illustrating examples of positions of an application command control user interface menu in an open position with which aspects of the present disclosure may be practiced. Open positioning of the application command control such as an application command control UI menu as previously described may occur when the application command control is operating in an open state. As an example, display of the application command control upon initial launch into an open state (e.g., based on launch of the application command control or action taken by a user) is shown in processing device view 1202. As shown in processing device view 1202, the application command control is docked at the bottom of the display of the processing device, below an application/application canvas. As an example, when the application command control is in an open state and only the application and the application command control are displayed, a height of the application command control may be set to be approximately half the display screen of a mobile device. However, as previously described, height of the application command control such as the application command control UI menu may be variable. Processing device view 1204 shows that position of the application command control changes on the screen when an SIP (e.g., soft input keyboard) is presented on a display of a processing device. As shown in processing device view 1204, positioning of the application command control in an open state is changed when the SIP is displayed, where the application command control is displayed above the SIP. In processing device view 1204, the application command control maintains a half-screen display but positioning of the application command control is above the SIP. Processing device view 1206 shows display of the application command control (in an open state), the SIP and a pane, sharing the display of a mobile device. As shown in processing device view 1206, the application command control is displayed below a pane. In an example where both a pane and an SIP are displayed, the application command control is displayed above the SIP and below the pane. Although example positions of the application command control are illustrated and described with respect to FIG. 12, one skilled in the art will recognize that positioning of the application command control such as the application command control UI menu on a display of a mobile device is able to be variably controlled by a program developer.

Figure 13:
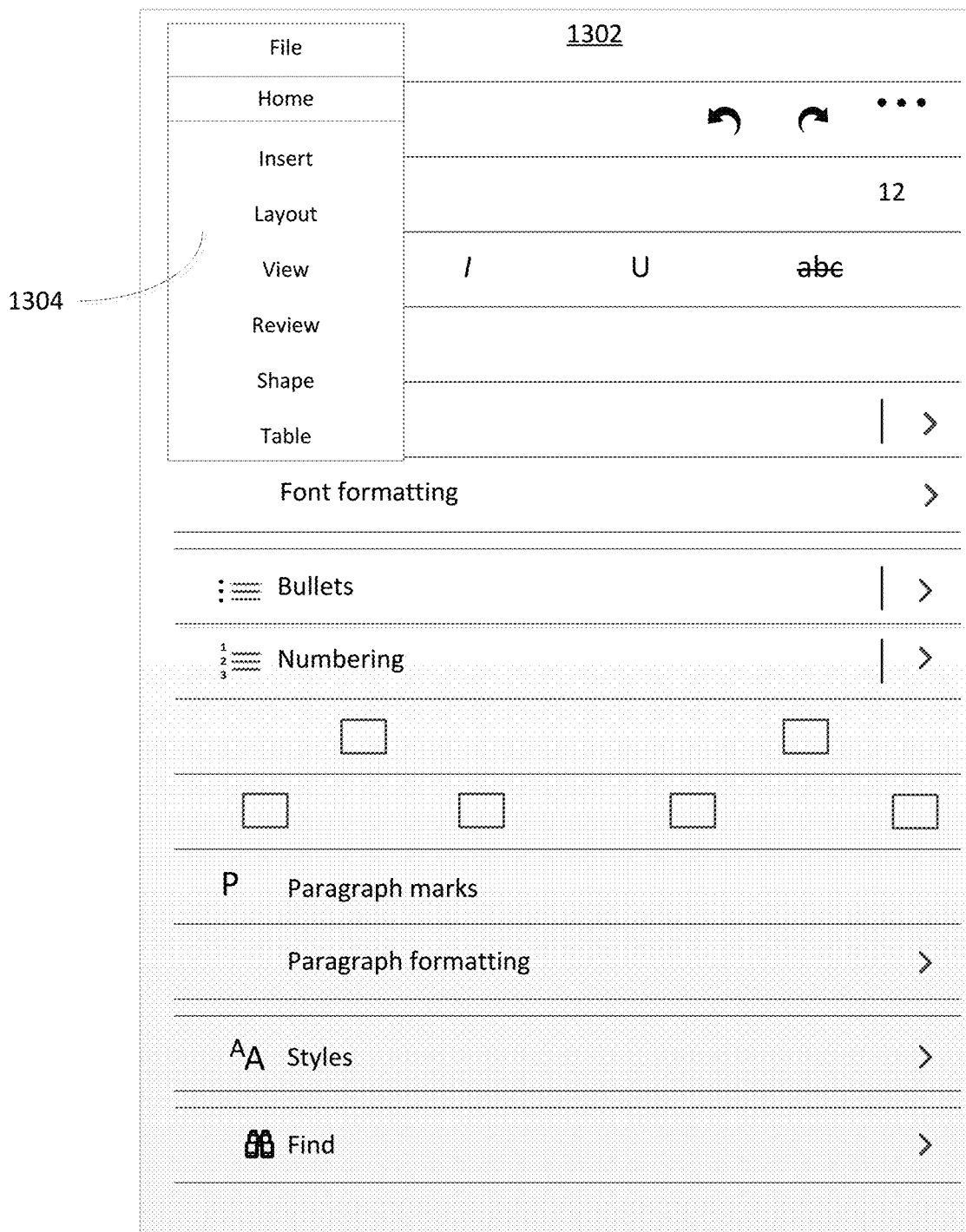
FIG. 13 illustrates a display including an exemplary application command control user interface element with which aspects of the present disclosure may be practiced.

FIG. 13 illustrates a display including an exemplary application command control user interface element with which aspects of the present disclosure may be practiced. Application command control 1302 is an exemplary top-level palette. A palette (e.g., a top-level palette or a drill-in palette) may comprise a palette switching feature 1304. A user may invoke a palette switching feature 1304 to change between palettes or change features/views of a palette. The palette switching feature 1304 may identify different palettes that a user can switch between as shown in the palette switching feature 1304. However, one skilled in the art will recognize that palettes of an application command control can comprise additional palettes or palettes types than are listed in display of the palette switching feature 1304.

FIG. 14 illustrates a display including an exemplary application command control user interface element with which aspects of the present disclosure may be practiced. Display 1402 demonstrates that the application command control intelligently adapts content of a palette (e.g., top-level palette or drill-in palette) based on selected content within an application. In one example, a shape object (such as a square) is selected so the options on the palette switcher changed based on the selection. For example, when a share object is selected the "Shape" palette becomes available and is accessible via the palette switcher as shown in FIG. 14. In another example a selection of a word from "square" is highlighted by a user in an application canvas of the display 2102. The application command control interfaces with the application and can intelligently offer suggestions to the user to enhance user experience. For example, a palette displaying a square shape may be displayed when the word "square" is selected in the application. In yet another example, the application command control may launch a search command or search pane (e.g., usage pane) to lookup the word "square" highlighted by the user.

Moreover, the palette may intelligently adapt to launching of applications and software components. For example, when an SIP component such as a virtual keyboard is launched, an application command control may input associated palettes such as text input palettes. In examples, the application command control may detect when a software component such as the SIP is dismissed and can intelligently adapt palette display to return to a palette that was displayed before launching of the SIP, for example.

Figure 15:
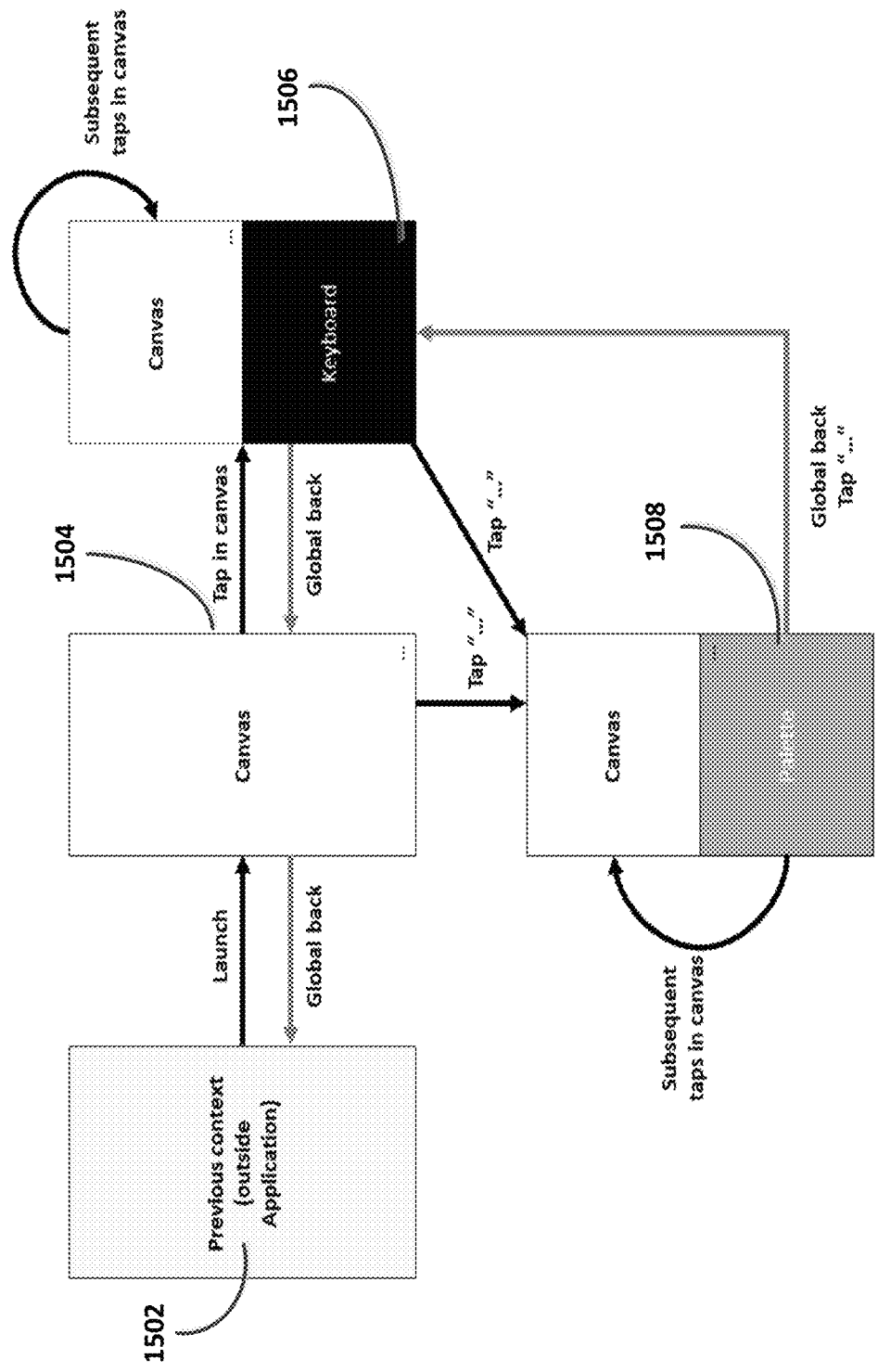
FIG. 15 illustrates exemplary interactions between components displayed on a display screen of a processing device with which aspects of the present disclosure may be practiced.

FIG. 15 illustrates exemplary interactions between components displayed on a display screen of a processing device with which aspects of the present disclosure may be practiced. As shown in FIG. 15, different processing device views 1502-1508 are used to describe user interface interactions between components described herein such as an application canvas of a launched application, a soft input keyboard application and an application command control menu (e.g., application command control user interface). Processing device views 1502-1508 illustrates exemplary displays that may be processed by and displayed upon a processing device/system. Processing device view 1502 illustrates display of a previous context on the display screen of an exemplary processing device. In response to launching an application, processing device view 1504 may be displayed. As shown in processing device view 1504, an application canvas for the launched application is display. An application canvas is workable display space defined within the launched application. For example, in a work processing application, the application canvas is a portion of the word processing application where a user may enter input such text, images, etc. In some examples, the application canvas may comprise a pane and/or application command control menu. In some examples, a display screen on a processing device may be updated to re-display the previous context (processing device view 1502) in response to received input from a user such as a selection of a button (e.g., global back, home button, etc.), received voice input, handwritten input, and touch input, among other examples.

Processing device view 1506 illustrates an exemplary view of the display screen where display is updates to display a soft input keyboard application (e.g., SIP). For example, in response to receiving input (e.g., a tap action, voice input, device input, etc.) that places focus within the application canvas, the processing device may update the display screen to display both the application canvas and the soft input keyboard application. In one example, the soft input keyboard application and/or the application canvas may be presented in a half-screen display. Subsequent received input into the application canvas may result in the processing device maintaining processing device view 1506.

Processing device views 1504-1508 illustrate an application command control menu (e.g., user interface element " . . . ") displayed in a minimized state. In response to input that selects a user interface element of the application command control menu, the display screen of the processing device may be updated to processing device view 1508. As an alternative example of FIG. 15, processing device view 1504 may be updated to processing device view 1508 in response to received input to open the application command control menu. Processing device view 1508 illustrates display of a palette of the application command control menu. A palette and examples of palettes such as top-level palettes and drill-in palettes have been previously described. Processing device view 1508 illustrates display of both the palette of the application command control menu and the application canvas. As an example, once the application command control menu is launched, subsequent input into the application canvas may result in the application command control remaining displayed on the display screen. The application command control menu may be programmed or configured to remain displayed until receipt of an input to dismiss the application command control menu is received. In other examples, the application command control menu may be configured to dismiss based on detecting input into other user interface components (e.g., application canvas, SIP, pane, etc.).

As an example, the application command control menu (e.g., palette) may display at a bottom portion of the display screen. However, one skilled in the art should recognize that the application command control menu may be configured to display in other portions of the displays screen in other scenarios. The application command control menu may display at a bottom portion of the display screen in any orientation (e.g., landscape, portrait, etc.). For instance, a change in an orientation may be detected from landscape mode to portrait mode. In that example, the processing device (through the programmed application command control menu) may update display of the application command control menu to display at the bottom portion of the processing device. User test case data provided indication that users prefer familiarity with the application command control menu as far as features and placement on a display. As such, the application command control menu may be programmed to be updatable to improve an interaction between a user and a processing device executing the application command control menu.

Figure 16:
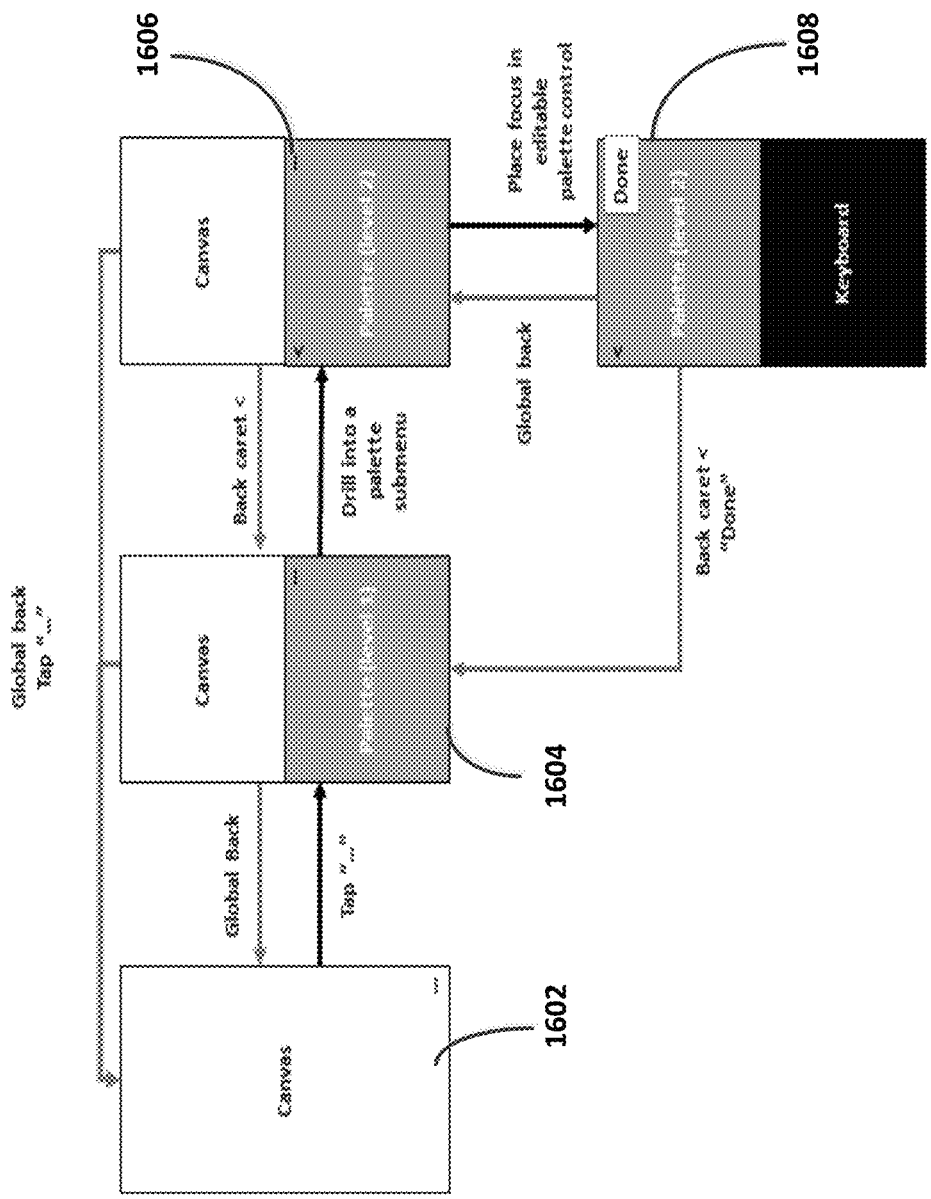
FIG. 16 illustrates exemplary interactions between components displayed on a display screen of a processing device with which aspects of the present disclosure may be practiced.

FIG. 16 illustrates exemplary interactions between components displayed on a display screen of a processing device with which aspects of the present disclosure may be practiced. As shown in FIG. 16, different processing device views 1602-1608 are used to describe user interface interactions between components described herein such as an application canvas of a launched application, a soft input keyboard application and an application command control menu (e.g., application command control user interface). Processing device views 1602-1608 illustrate exemplary displays that may be processed by and displayed upon a processing device/system.

Processing device view 1602 illustrates display of the application canvas as previous described. As shown in processing device view 1602, the application canvas may be presented in a majority of the display screen with the application command control menu displayed in a minimized state at the bottom portion of the display screen. In response to received input to expand the application command control menu, flow may proceed from processing device view 1602 to processing device view 1604, displaying the application command control menu (e.g., "Palette (level 1)") in an open state. In processing device view 1604, the application canvas is also presented, where the palette of the application command control menu shares the screen with the application canvas. In examples, a user may select a user interface element (e.g., " . . . ") to change the state of the application command control menu from an open state back to a minimized state (as shown in processing device view 1602). While processing device view 1602 is displayed, the processing device may receive input to display another palette (e.g., drill into a sub palette (e.g., drill-in palette) of a displayed palette (e.g., top-level palette)). In response to the received input, the processing device may update display to processing device view 1606. In processing device view 1606, display of the application command control menu is updated, for example, to display another palette (e.g., "Palette (level 2)") in place of the first displayed palette. As an example, the displayed palette in processing device view 1606 may be a drill-in palette of a top-level palette (that may be displayed in processing device view 1604). The user may select a user interface element (e.g., "back caret <") within the drill-in palette to update display to return back to the top-level palette.

In some examples, a palette (e.g., top-level palette or drill-in palette) may comprise an input field that is editable by a user. For instance, a palette may comprise a user interface element for entering an input (e.g., font size, type, etc., description, comments, notes, etc.) where a user can specify a type of input to be entered into the application command control menu. In response to a focus point (e.g., device input, touch input, voice input, etc.) being placed in an editable portion of the palette, the processing device may update display on the display screen to processing device view 1608. Processing device view 1608 illustrates display of a palette of the application command control menu as well as the soft input keyboard application. In the example shown, the processing device may be configured to display the palette of the application command control menu above the soft input keyboard application. For instance, in comparing processing device view 1606 to processing device view 1608, the application command control menu (e.g, "palette (level 2)") replaces the application canvas and the soft input keyboard application is displayed in place of where the application command control menu was previously displayed.

Figure 17:
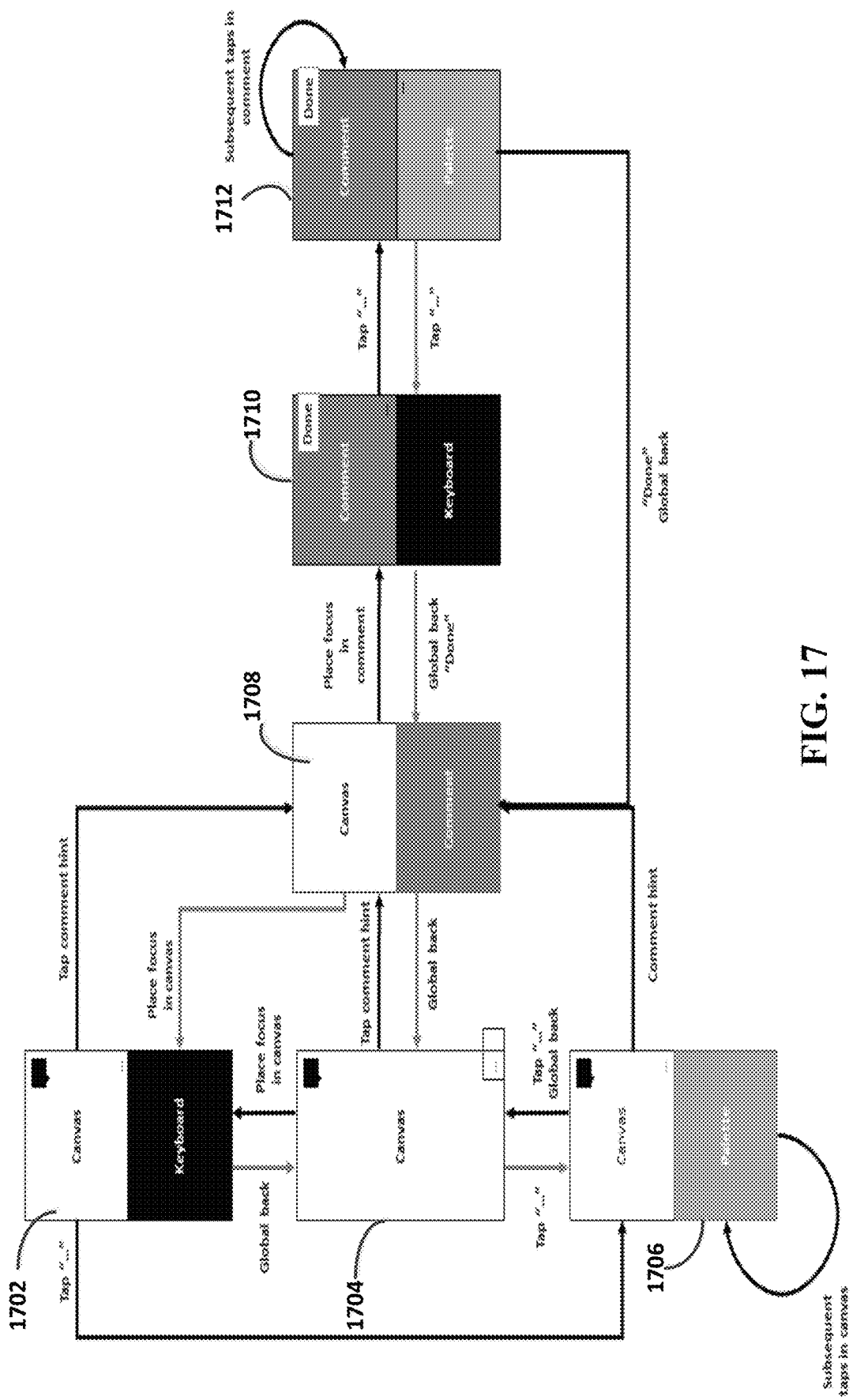
FIG. 17 illustrates exemplary interactions between components displayed on a display screen of a processing device with which aspects of the present disclosure may be practiced.

FIG. 17 illustrates exemplary interactions between components displayed on a display screen of a processing device with which aspects of the present disclosure may be practiced. As shown in FIG. 17, different processing device views 1702-1712 are used to describe user interface interactions between components described herein such as an application canvas of a launched application, a comment pane, a soft input keyboard application and an application command control menu (e.g., application command control user interface). Processing device views 1702-1712 illustrate exemplary displays that may be processed by and displayed upon a processing device/system.

As shown in processing device view 1702 an application canvas, the application command control menu and the soft input keyboard are displayed. Within the application canvas, a user interface element may be displayed that provides a shortcut to a comment pane. A comment pane is a user interface element for entering data (e.g. a comment) to attach to content displayed in the application/application canvas. The comment pane may be accessed using the user interface element. However, in other examples, the comment pane may be accessed through other components such as the application command control menu, an SIP, and other portions of the application canvas. In some examples of FIG. 17, an exemplary processing device may update from processing device view 1702 to processing device view 1704 in response to an input (e.g., global back) to that signals removal of the soft input keyboard application. In processing device view 1704, the application command control menu remains displayed in a minimized state. As highlighted in processing device view 1704, selection may occur of a user interface element to toggle a state of the application command control menu. In response, the processing device may update the display screen to processing device view 1706, where the application command control menu is displayed in an open state (along with the application canvas).

In other examples of FIG. 17, a user may select the user interface element providing a shortcut to the comment pane as shown in processing device view 1702. In that example, the processing device may update display to processing device view 1708. In processing device view 1708, the comment pane is expanded and displayed along with the application canvas. The user can select user interface elements to toggle between states (e.g., return back to processing device views 1702 or 1704. In one example, in response to detecting that a user placed focus within the comment pane, the processing device may update the display screen to processing device view 1710. In processing device view 1710, display is updated to display the comment pane, the application command control menu and the soft input keyboard application. In processing device view 1710, display of the comment pane is moved upwards on the display screen and the soft input keyboard application is displayed below both the expanded comment pane and the application command control menu (displayed in a minimized state). In response to input to expand the application command control menu to an open state while in processing device view 1710, the processing device may update display to processing device view 1712. In processing device view 1712, the comment pane is displayed along with an application command control menu, which is displayed in an open state. A user may provide input that results in the processing device toggling between processing device views 1710 and 1712, among other examples. In one example, subsequent input received in the comment pane (e.g., taps in the comment pane) may result in the processing device maintaining processing device view 1712. In another example, the processing device may receive input to close the comment pane.

In response, the processing device may update display to another processing device view such as processing device view 1704, for example.

Non-limiting examples of the present disclosure describe processing devices, computer-implemented methods and computer-readable storage devices associated with launching of an application command control that is programmed for display on small screens when it is detected that a display width associated with the processing device is equal to or less than a threshold value. In examples, the application command control interfacing with an application executing on the processing device and comprising a plurality of top-level palettes and a plurality of drill-in palettes programmed for the application. A top-level palette for the application is vertically scrollable and comprises a collection of rows comprising one or more selectable command elements. A row of the one or more command elements of the top-level palette comprises a drill-in feature that when selected presents a drill-in palette. The drill-in palette is vertically scrollable and comprising one or more rows of selectable command elements. In at least one example, the display width detected corresponds to an operating size of a display window for the application, and the launching determines whether the operating size is equal to or less than a threshold value associated with the operating size. The application command control may intelligently adapt content of at least one of the top-level palette, the drill-in palette, and a palette switcher based on selected content within the application.

In examples, the plurality of top-level palettes and the plurality of drill-in palettes interface with the application, a software input panel of the processing device and at least one pane. The application command control is also programmable to interface with a plurality of applications including the application. Operations executed may further comprise detecting launching of another application, and launching a version of the application command control programmed for the other application when the other application is launched.

In examples, launching comprises launching the application command control in a minimized state hiding palettes of the application command control. Position of the application command control may change based on launching of a soft input panel. The application command control may be displayed at a bottom portion of a display of the processing device. In another example, the application command control comprises at least two parts, a first part displaying at a top portion of a display of the processing device and a second part displaying at a bottom portion of the display of the processing device. The application command control supports a portrait orientation and a landscape orientation for execution with the application, and wherein the operations executed further comprising changing display of the application command control when an orientation of the processing device changes, wherein when the changing of the display of the application command control is changed from a first orientation to a second orientation, the application command control is displayed in a minimized state in the second orientation.

Launching of the application command control may further comprise displaying the top-level palette, and after receiving a selection of the drill-in feature, presenting the drill-in palette along with the top-level palette, wherein the drill-in emerges horizontally from the top-level palette upon selection of the drill-in feature. During an active session of the application where the application command control is launched, the application command control displays a last used palette when the application command control is dismissed and re-invoked or changes from a minimized state to an open state, and the application command control displays the top-level palette of the drill-in palette upon entry into an open state when the last used palette is a drill-in palette and the application command control is placed in a minimized state or the application is exited. Operations executed may further recognizing selection of the drill-in feature, presenting the drill-in palette, recognizing selection of a feature requesting return to the top-level palette and presenting the top-level palette.

In further examples, operations executed comprise setting a layout of at least the top-level palette, wherein the setting further comprises determining commands to include in a row of the top-level palette based on command grouping data and/or data obtained from user case studies, wherein the row of the top-level palette comprises one or more commands up to a determined maximum number of commands that are displayable per row. Setting of the layout further comprises scaling commands in a row when a row to be displayed comprises less than the determined maximum number of commands that are displayable per row. Operations executed may further comprise setting a height for display of a palette, of the plurality of top-level palettes and the plurality of drill-in palettes, and displaying the palette in accordance with the set height for display when the palette is in an open state based on the display size. Layout of a drill-in palette may be similarly set to operations described above.

Non-limiting examples of the present disclosure describe an application command control user interface menu to facilitate user interaction between a user and a mobile application. On a processing device, a mobile application is launched where the mobile application comprises an application command control user interface menu displayable within a defined display space of the mobile application. The application control user interface menu is displayed within the defined display space. A tab comprises one or more user interface elements for application command control. Input is received for selection of a tab of the application control user interface menu. In response to the received input, display of the application command control user interface menu is modified to display one or more tabs (or additional tabs) within the defined display space. In some examples, displaying of the application control user interface menu further comprises displaying a plurality of tabs of a palette in a vertically-scrollable listing within the defined display space. The defined display space is programmatically determined based on at least one of a detected display size of the processing device executing the mobile application and a display class designation associated with a display size of the processing device. In examples, the application control user interface menu is displayed in a minimized state in response to launching the mobile application. Input may be received to expand the application control user interface menu, and the application control user interface menu may be displayed in an open state in response to the received input to expand the application control user interface menu. In some examples, tabs are grouped for display in palettes, and received input to modify display of the application command control user interface menu is a user interface element to switch between the palettes of the application command control user interface menu. In additional examples, selection of a portion of content within the mobile application may be received, and display of the application command control user interface menu may be modified within the defined display space to display a tab for manipulating the selected portion of content, wherein the modifying further comprises replacing, within the defined display space, at least one displayed tab with a display of the tab for manipulating the selected portion of content. Other examples may comprise determining the defined display space based on a display size of the processing device, and setting a layout setting of the application command control user interface menu based on the display size, wherein setting of the layout comprises defining a number of tabs to include in a palette of the user interface menu based on the display size and the determined defined display space, and wherein the application command control user interface menu is displayed in accordance with the set layout. In examples application control commands may be arranged within a plurality of palettes of the application command control user interface menu, wherein the palettes comprise a plurality of primary command palettes and a plurality of secondary command palettes, and wherein a primary command palette comprises one or more application control commands and a secondary command palette comprises at least one of: overflow application control commands from a primary command palette and additional user interface features for application command control.

In other non-limiting examples, an application command control user interface menu is launched to facilitate user interaction between a user and a mobile application. A display size is detected for a processing device requesting access to a mobile application. A version of the mobile application is launched based on the detected display size of the processing device in response to detecting that the display size is less than or equal to a threshold value. Launching of the mobile application further comprises defining a display space within a mobile application for an application command control user interface menu, based on the display size. Launching of the mobile application further comprises defining a layout for application command control user interface menu based on the display size. The defining of the layout comprises grouping one or more application control commands in a primary palette and grouping one or more of the application control commands in a secondary palette of the primary palette. The application command control user interface menu is generated for display within the defined display space in accordance with the defined layout. The generated application command control user interface menu may be displayed within the launched version of the mobile application. In additional examples, input is received to modify a display of the application command control user interface menu, and in response to the received input, display of the application command control user interface menu is modified to display one or more tabs within the defined display space. As an example, a tab comprises one or more user interface elements for application command control.

Non-limiting examples of the present disclosure describe an application command control user interface menu to facilitate user interaction between a user and a mobile application. An application command control menu is displayed on a display screen of a processing device. In some examples, the application command control menu is initially displayed in a minimized state, and may remain displayed in the minimized state in response to received input into an application canvas of a launched application. In examples, the application command control menu may be displayed at the bottom portion of the display screen or at a side portion of the display screen. However, one skilled in the art should recognize that the application command control menu may be programmed to display on any portion of the display screen. An input may be received into an application canvas of a launched application. The application canvas may be positioned above the application command control menu on the display screen. In response to a received input into the application canvas, a soft input keyboard application may be displayed. The soft input keyboard application may display below the application command control menu on the display screen. A selection may be received in the application command control menu. In examples, the received selection in the application command control menu may cause the soft input keyboard application to be dismissed. In response to the received selection, display of the application command control menu may be expanded to replace display on the soft input keyboard application on the display screen. In some examples, expanding display of the application command control menu comprises displaying the application command control menu in a half-screen display. An expanded application command control menu (e.g., open state) may display a palette including a plurality of application command controls, wherein the palette is vertically scrollable and displays the plurality of application command controls in one or more rows. Input may be received to dismiss the application command control menu, wherein the application command control menu is displayed in the minimized state at the bottom portion of the display screen in response to the received input. In additional examples, change to an orientation of the processing device may be detected. In response to the detecting of the changing of the orientation, display of the application command control menu is updated to display at the bottom portion of the display screen or a side portion of the display screen.

In other non-limiting examples, other user interface interactions are described for displaying an application command control menu on a display screen of a processing device. A palette of an application command control menu on may be displayed on a display screen of a processing device/system. In some examples, the application command control menu may be launched in a minimized state on the display screen. Input may be received to expand the application command control menu, and wherein the application command control menu enters an open state to display the palette in response to the received input. The palette may be vertically scrollable and includes a plurality of application command controls displayed in one or more rows of the palette. Input may be received into an editable portion of the palette. In response to the received input, a soft input keyboard application is invoked on the display screen. Invocation of the soft keyboard application updates display of the system to shift the palette to a top portion of the display screen, wherein the soft input keyboard application displays on a portion of the display screen below the palette. In examples, input may be received into the soft input panel keyboard application and data corresponding with the received input may be inserted into the editable portion of the palette. In examples, the palette may remain visible on the display screen of the system until explicitly dismissed. The palette may be a top-level palette that comprises one or more selectable user interface command elements. As an example, one of the selectable user interface command elements of the top-level palette is a user interface element, that when selected, is configured to display a drill-in palette. The drill-in palette is vertically scrollable and comprises a subset of user interface command elements that correspond with the top-level palette. Selection of the user interface element may be received, and in response to the received selection, the drill-in palette may be displayed on the display screen. In examples, the display screen may be updated to replace display of the top-level palette with the drill-in palette.

Furthermore, other non-limiting examples describe user interface interactions involving a pane such as a comment pane. An application canvas for a launched application is displayed on a display screen of a processing device. A comment pane may be displayed on the display screen, where the comment pane is usable for entering a comment to attach to content displayed in the application canvas. Input may be received that places a focus point in the comment pane. In response to the received input, a soft input keyboard application is displayed on the display screen. The display screen may be updated to replace display of the application canvas with display of the comment pane and display the soft input keyboard application below the comment pane. However, one skilled in the art should recognize that a launched application may be programmed to update display, including placement of user interface objects, in any manner. Further examples may include receiving subsequent input that places focus on the comment pane. As an example, the subsequent input is a tap action that places focus on the comment pane. In response to the received subsequent input, the display screen may be updated to display a palette for application command control, wherein the palette is vertically scrollable and comprises a plurality of application command controls displayed in one or more rows. Update to the display screen may further comprise replacing display of the soft input keyboard application with display of the palette. In additional examples a third input is received that places focus on the comment pane. As an example, the received third input is a tap action into the comment pane. In response to the received third input, the display screen is updated to re-display the application canvas in place of the comment pane. In such an example, the comment pane is removed from the display screen. In other examples, selection of a user interface element to minimize the palette may be received in the palette. In response to the received selection of the user interface element in the palette, display of the palette may be minimized to display in a minimized state and display of the application canvas may be maximized.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:
1. A computer-implemented method comprising:
  causing a first display including an application canvas that shows effects implemented by actions executed via an application command control and an application com- mand control menu, wherein the application command control menu is in a minimized state below the application canvas;

receiving an indication to open the application command control menu;

in response to the received indication, causing a second display including a reduced version of the application canvas and an expanded version of the application command control menu expanded from the minimized state to an open state, wherein, in the second display:

the reduced version of the application canvas is displayed above the expanded version of the application command control menu; and the expanded version of the application command control menu in the open state comprises a top-level palette;

receiving a first selection at the top-level palette of the expanded version of the application command control menu, wherein the first selection is an instruction to drill into a palette submenu of the top-level palette of the expanded version of the application command control menu;

in response to the first selection, causing a third display including the reduced version of the application canvas and a drill-in palette application command control menu replacing the expanded version of the application command control menu, wherein, in the third display, the drill-in palette application command control menu comprises an editable input field;

receiving a focus point instruction at the editable input field of the drill-in palette application command control menu;

in response to the focus point instruction, causing a fourth display by:

moving up the drill-in palette application command control menu to remove the reduced version of the application canvas from displaying; and displaying a soft input keyboard below the drill-in palette application command control menu; and receiving a second selection at the drill-in palette of the application command control menu while displaying the fourth display including the soft input keyboard below the drill-in palette application command control menu;

in response to the second selection, causing redisplay of the second display including the reduced version of the application canvas and the expanded version of the application command control menu below the reduced version of the application canvas;

receiving a back indication while displaying the fourth display including the soft input keyboard below the drill-in palette application command control menu; and in response to the back indication, causing redisplay of the third display including the reduced version of the application canvas and the drill-in palette application command control menu below the reduced version of the application canvas.

2. The computer-implemented method according to claim 1, wherein the application command control menu remains displayed in the minimized state in response to a received input into the application canvas.

3. The computer-implemented method according to claim 1, further comprising receiving input to dismiss the application command control menu, and minimizing a display of the application command control menu to display the application command control menu in the minimized state.

4. The computer-implemented method according to claim 1, wherein causing the second display of the application command control menu from the minimized state to the open state comprises causing a display of the application command control menu in a half-screen view.

5. The computer-implemented method according to claim 4, wherein the application command control menu in the open state comprises a palette including a plurality of application command controls, wherein the palette is vertically scrollable and the plurality of application command controls are in one or more rows.

6. The computer-implemented method according to claim 1, further comprising:

receiving input to dismiss the soft input keyboard application; and in response to the received input, hiding the soft input keyboard.

7. The computer-implemented method according to claim 1, wherein the application command control menu is displayed on a display screen of a processing device, and the method further comprises detecting a change to an orientation of the processing device, and in response to a detected change of the orientation, updating a display of the application command control menu to display at a bottom portion or a side portion of the display screen.

8. The computer-implemented method according to claim 1, wherein causing the second display includes causing a display of the drill-in palette application command control menu in a half-screen view.

9. The computer-implemented method according to claim 8, wherein the half-screen view of the drill-in palette application command control menu is below the reduced version of the application canvas.

10. The computer-implemented method according to claim 1, further comprising receiving a third selection the application command control menu of the second display; and in response to the second selection, causing redisplay of the first display, which includes the application canvas and the application command control menu in the minimized state below the application canvas.

* * * * *